(12) United States Patent
Williams et al.

(10) Patent No.: US 9,327,397 B1
(45) Date of Patent: May 3, 2016

(54) TELEPRESENCE BASED INVENTORY PICK AND PLACE OPERATIONS THROUGH ROBOTIC ARMS AFFIXED TO EACH ROW OF A SHELF

(71) Applicants: Jeff Williams, El cerrito, CA (US); Ravi Bhaskaran, San Francisco, CA (US); Charlie Martin, Walnut Creek, CA (US)

(72) Inventors: Jeff Williams, El cerrito, CA (US); Ravi Bhaskaran, San Francisco, CA (US); Charlie Martin, Walnut Creek, CA (US)

(73) Assignee: CODESHELF, Oakland, CA (US)

( * ) Notice: Subject to any disclaimer, the term of this patent is extended or adjusted under 35 U.S.C. 154(b) by 0 days.

(21) Appl. No.: 14/726,458

(22) Filed: May 30, 2015

Related U.S. Application Data

(60) Provisional application No. 62/145,488, filed on Apr. 9, 2015.

(51) Int. Cl.
*G06F 19/00* (2011.01)
*B25J 3/00* (2006.01)
(Continued)

(52) U.S. Cl.
CPC *B25J 3/00* (2013.01); *B25J 13/006* (2013.01); *B65G 1/137* (2013.01)

(58) Field of Classification Search
CPC ............... B25J 3/00; B25J 5/00; B25J 5/005; B25J 5/02; B25J 9/0084; B25J 9/10; B25J 11/005; B25J 13/00; B25J 13/006; B25J 13/02; B65G 1/137; B65G 1/1373
USPC ......... 700/245, 246, 247, 248, 253, 255, 257, 700/258, 260, 261, 264; 318/567, 568.11, 318/568.14, 568.16, 568.17, 568.2, 568.21, 318/568.25; 414/1, 2, 5, 22.01, 227, 265, 414/266

See application file for complete search history.

(56) References Cited

U.S. PATENT DOCUMENTS

| 3,690,479 A | 9/1972 | Castaldi |
| 3,958,102 A | 5/1976 | Burt |

(Continued)

FOREIGN PATENT DOCUMENTS

| CA | 2577346 A1 | 4/2006 |
| CA | 2652114 A1 | 12/2007 |

(Continued)

OTHER PUBLICATIONS

Peter Whitney et al. "A Low-Friction Passive Fluid Transmission and Fluid-Tendon Soft Actuator", IEEE/RSJ International Conference on Intelligent Robots and Systems (IROS) 2014, Sep. 14, 2014 (pp. 8) http://www.disneyresearch.com/wp-content/uploads/Project_FluidSoftActuator_IROS14_paper.pdf.

(Continued)

Primary Examiner — Jaime Figueroa
(74) Attorney, Agent, or Firm — Raj Abhyanker, P.C.

(57) ABSTRACT

Disclosed are a system and/or a method of telepresence based inventory pick and place operations through actuator controlled robotic arms affixed to each row of a shelf. A method includes mounting a robotic arm at an end of a row of a shelf of inventory on a set of rails affixed to the row of a shelf. The robotic arm is permitted to move horizontally along the row of the shelf. The robotic arm is repositioned along the three axes using a set of actuators. A haptic motion of a human user is mirrored that is remotely using a positioning device (e.g., human may feel the feedback of the remote arm as it touches the objects). An item is placed on a counting platform in front of the robotic arm. The items are placed automatically in the designated location down through a transport means when a pick operation is completed.

30 Claims, 12 Drawing Sheets

(51) Int. Cl.
  *B65G 1/137* (2006.01)
  *B25J 13/00* (2006.01)

(56) References Cited

U.S. PATENT DOCUMENTS

| | | | |
|---|---|---|---|
| 4,093,086 A | 6/1978 | Lucas et al. |
| 4,563,739 A | 1/1986 | Gerpheide et al. |
| 4,716,530 A | 12/1987 | Ogawa et al. |
| 4,737,910 A | 4/1988 | Kimbrow |
| 4,974,166 A | 11/1990 | Maney et al. |
| 5,050,153 A | 9/1991 | Lee |
| 5,117,096 A | 5/1992 | Bauer et al. |
| 5,166,884 A | 11/1992 | Maney et al. |
| 5,228,820 A | 7/1993 | Stansfield et al. |
| 5,311,335 A | 5/1994 | Crabtree |
| 5,328,260 A | 7/1994 | Beirise |
| 5,362,197 A | 11/1994 | Rigling |
| 5,394,766 A | 3/1995 | Johnson et al. |
| 5,434,775 A | 7/1995 | Sims et al. |
| 5,595,263 A | 1/1997 | Pignataro |
| 5,625,559 A | 4/1997 | Egawa |
| 5,646,389 A | 7/1997 | Bravman et al. |
| 5,664,113 A | 9/1997 | Worger et al. |
| 5,720,157 A | 2/1998 | Ross |
| 5,963,134 A | 10/1999 | Bowers et al. |
| 6,089,453 A | 7/2000 | Kayser et al. |
| 6,105,004 A | 8/2000 | Halperin et al. |
| 6,164,537 A | 12/2000 | Mariani et al. |
| 6,176,392 B1 | 1/2001 | William et al. |
| 6,208,908 B1 | 3/2001 | Boyd et al. |
| 6,289,260 B1 | 9/2001 | Bradley et al. |
| 6,307,952 B1 | 10/2001 | Dietz |
| 6,339,764 B1 | 1/2002 | Livesay et al. |
| 6,341,271 B1 | 1/2002 | Salvo et al. |
| 6,463,360 B1 | 10/2002 | Terada et al. |
| 6,505,093 B1 * | 1/2003 | Thatcher ............ B65G 1/1376 700/214 |
| 6,535,790 B2 | 3/2003 | Nakano et al. |
| 6,550,674 B1 | 4/2003 | Neumark |
| 6,567,788 B1 | 5/2003 | Johnson, Jr. |
| 6,602,037 B2 | 8/2003 | Winkler |
| 6,622,127 B1 | 9/2003 | Klots et al. |
| 6,652,213 B1 | 11/2003 | Mitchell et al. |
| 6,678,583 B2 | 1/2004 | Nasr et al. |
| 6,681,990 B2 | 1/2004 | Vogler et al. |
| 6,748,292 B2 | 6/2004 | Mountz |
| 6,845,912 B2 | 1/2005 | Scannell |
| 6,870,464 B2 | 3/2005 | Okamura |
| 6,895,301 B2 | 5/2005 | Mountz |
| 6,927,692 B1 | 8/2005 | Petrinovic |
| 6,950,722 B2 | 9/2005 | Mountz |
| 6,988,518 B2 | 1/2006 | Rackers |
| 7,009,501 B2 | 3/2006 | Olch |
| 7,036,729 B2 | 5/2006 | Chung |
| 7,062,455 B1 | 6/2006 | Tobey |
| 7,152,040 B1 | 12/2006 | Hawthorne et al. |
| 7,234,609 B2 | 6/2007 | DeLazzer et al. |
| 7,238,079 B2 | 7/2007 | Madhani et al. |
| 7,252,230 B1 | 8/2007 | Sheikh et al. |
| 7,267,271 B2 | 9/2007 | Rhea |
| 7,342,494 B2 | 3/2008 | Maloney |
| 7,402,018 B2 | 7/2008 | Mountz et al. |
| 7,418,405 B1 | 8/2008 | Utter et al. |
| 7,504,949 B1 | 3/2009 | Rouaix et al. |
| 7,516,848 B1 | 4/2009 | Shakes et al. |
| 7,591,630 B2 | 9/2009 | Lert, Jr. et al. |
| 7,610,115 B2 | 10/2009 | Rob et al. |
| 7,628,093 B2 | 12/2009 | Madhani et al. |
| 7,650,298 B2 | 1/2010 | Godlewski |
| 7,693,757 B2 | 4/2010 | Zimmerman |
| 7,698,176 B2 | 4/2010 | Taylor et al. |
| 7,706,920 B2 | 4/2010 | Wieland |
| 7,718,105 B2 | 5/2010 | Tye et al. |
| 7,740,953 B2 | 6/2010 | Jackson et al. |
| 7,751,928 B1 | 7/2010 | Antony et al. |
| 7,774,243 B1 | 8/2010 | Antony et al. |
| 7,791,471 B2 | 9/2010 | Glynn et al. |
| 7,819,719 B2 | 10/2010 | Tye et al. |
| 7,826,919 B2 | 11/2010 | D'Andrea et al. |
| 7,826,920 B2 | 11/2010 | Stevens et al. |
| 7,850,413 B2 | 12/2010 | Fontana |
| 7,873,469 B2 | 1/2011 | D'Andrea et al. |
| 7,887,729 B2 | 2/2011 | Tye et al. |
| 7,894,932 B2 | 2/2011 | Mountz et al. |
| 7,894,933 B2 | 2/2011 | Mountz et al. |
| 7,912,574 B2 | 3/2011 | Wurman et al. |
| 7,916,028 B2 | 3/2011 | Oberle |
| 7,920,962 B2 | 4/2011 | D'Andrea et al. |
| 7,984,500 B1 | 7/2011 | Khanna et al. |
| 8,006,903 B2 | 8/2011 | Braun et al. |
| 8,032,417 B2 | 10/2011 | Marella et al. |
| 8,042,171 B1 | 10/2011 | Nordstrom et al. |
| 8,052,185 B2 | 11/2011 | Madhani |
| 8,060,255 B2 | 11/2011 | Wieland |
| 8,068,978 B2 | 11/2011 | D'Andrea et al. |
| 8,170,711 B2 | 5/2012 | D'Andrea et al. |
| 8,209,748 B1 | 6/2012 | Nordstrom et al. |
| 8,220,710 B2 | 7/2012 | Hoffman et al. |
| 8,239,291 B2 | 8/2012 | Hoffman et al. |
| 8,244,469 B2 | 8/2012 | Cheung et al. |
| 8,244,603 B1 | 8/2012 | Tang et al. |
| 8,249,245 B2 | 8/2012 | Jay et al. |
| 8,265,873 B2 | 9/2012 | D'Andrea et al. |
| 8,269,447 B2 | 9/2012 | Smoot et al. |
| 8,276,739 B2 | 10/2012 | Bastian, II et al. |
| 8,280,546 B2 | 10/2012 | D'Andrea et al. |
| 8,280,547 B2 | 10/2012 | D'Andrea et al. |
| 8,301,294 B1 | 10/2012 | Shakes et al. |
| 8,306,650 B1 | 11/2012 | Antony et al. |
| 8,307,073 B1 | 11/2012 | Brundage et al. |
| 8,307,099 B1 | 11/2012 | Khanna et al. |
| 8,310,923 B1 | 11/2012 | Nordstrom et al. |
| 8,311,902 B2 | 11/2012 | Mountz et al. |
| 8,335,585 B2 | 12/2012 | Hansl et al. |
| 8,336,420 B2 | 12/2012 | Carter et al. |
| 8,351,689 B2 | 1/2013 | Turner et al. |
| 8,374,724 B2 | 2/2013 | Wieland et al. |
| 8,374,926 B2 | 2/2013 | Solomon |
| 8,412,400 B2 | 4/2013 | D'Andrea et al. |
| 8,425,173 B2 | 4/2013 | Lert et al. |
| 8,429,806 B2 | 4/2013 | Tye et al. |
| 8,433,437 B1 | 4/2013 | Shakes et al. |
| 8,438,149 B1 | 5/2013 | Dicker et al. |
| 8,444,369 B2 | 5/2013 | Watt et al. |
| 8,458,227 B1 | 6/2013 | Brundage et al. |
| 8,473,374 B2 | 6/2013 | Allison et al. |
| 8,483,869 B2 | 7/2013 | Wurman et al. |
| 8,502,862 B2 | 8/2013 | Turner |
| 8,538,692 B2 | 9/2013 | Wurman et al. |
| 8,542,816 B2 | 9/2013 | Kaufman et al. |
| 8,548,613 B2 | 10/2013 | Presetenback et al. |
| 8,565,909 B2 | 10/2013 | Bickel et al. |
| 8,568,642 B2 | 10/2013 | Jackson et al. |
| 8,571,700 B2 | 10/2013 | Keller et al. |
| 8,576,235 B1 | 11/2013 | Sumner et al. |
| 8,577,759 B2 | 11/2013 | Solomon |
| 8,594,834 B1 | 11/2013 | Clark et al. |
| 8,600,035 B2 | 12/2013 | Jay et al. |
| 8,606,392 B2 | 12/2013 | Wurman et al. |
| 8,612,641 B1 | 12/2013 | Bozarth et al. |
| 8,626,335 B2 | 1/2014 | Wurman et al. |
| 8,626,935 B2 | 1/2014 | Khanna et al. |
| 8,639,382 B1 | 1/2014 | Clark et al. |
| 8,649,899 B2 | 2/2014 | Wurman et al. |
| 8,651,916 B2 | 2/2014 | Irmler et al. |
| 8,655,730 B1 | 2/2014 | Swan et al. |
| 8,688,598 B1 | 4/2014 | Shakes et al. |
| 8,700,499 B2 | 4/2014 | Laughlin et al. |
| 8,700,502 B2 | 4/2014 | Mountz et al. |
| 8,712,872 B2 | 4/2014 | Smith et al. |
| 8,718,814 B1 | 5/2014 | Clark et al. |
| 8,723,872 B2 | 5/2014 | Beardsley et al. |
| 8,725,286 B2 | 5/2014 | D'Andrea et al. |
| 8,731,708 B2 | 5/2014 | Shakes et al. |

(56) References Cited

U.S. PATENT DOCUMENTS

| | | | |
|---|---|---|---|
| 8,740,538 B2 | 6/2014 | Lert et al. | |
| 8,744,627 B2 | 6/2014 | Wieland | |
| 8,761,927 B2 | 6/2014 | Johnson et al. | |
| 8,763,116 B1 | 6/2014 | Khanna et al. | |
| 8,781,624 B2 | 7/2014 | Hodgins et al. | |
| 8,786,680 B2 | 7/2014 | Shiratori et al. | |
| 8,798,784 B1 | 8/2014 | Clark et al. | |
| 8,798,786 B2 | 8/2014 | Wurman et al. | |
| 8,801,488 B2 | 8/2014 | Irmler | |
| 8,803,951 B2 | 8/2014 | Gay et al. | |
| 8,805,573 B2 | 8/2014 | Brunner et al. | |
| 8,805,574 B2 | 8/2014 | Stevens et al. | |
| 8,805,584 B2 | 8/2014 | Yamane | |
| 8,812,378 B2 | 8/2014 | Swafford, Jr. et al. | |
| 8,821,781 B2 | 9/2014 | Martin | |
| 8,823,639 B2 | 9/2014 | Jackson et al. | |
| 8,831,984 B2 | 9/2014 | Hoffman et al. | |
| 8,848,898 B2 | 9/2014 | Jay et al. | |
| 8,858,351 B2 | 10/2014 | Crawford | |
| 8,874,262 B2 | 10/2014 | Mistry | |
| 8,874,444 B2 | 10/2014 | Irmler et al. | |
| 8,876,571 B2 | 11/2014 | Trowbridge et al. | |
| 8,879,717 B2 | 11/2014 | Jay et al. | |
| 8,884,948 B2 | 11/2014 | Turner et al. | |
| 8,886,710 B2 | 11/2014 | Evans et al. | |
| 8,892,240 B1 | 11/2014 | Vliet et al. | |
| 8,898,137 B1 | 11/2014 | Brundage et al. | |
| 8,909,368 B2 | 12/2014 | D'Andrea et al. | |
| 8,917,202 B2 | 12/2014 | Grosinger et al. | |
| 8,918,202 B2 | 12/2014 | Kawano | |
| 8,918,645 B2 | 12/2014 | Evans et al. | |
| 8,927,081 B2 | 1/2015 | Tye et al. | |
| 8,930,133 B2 | 1/2015 | Wurman et al. | |
| 8,939,840 B2 | 1/2015 | Heatherly et al. | |
| 8,947,422 B2 | 2/2015 | Turner et al. | |
| 8,965,560 B2 | 2/2015 | Mathi et al. | |
| 8,965,561 B2 | 2/2015 | Jacobus et al. | |
| 8,965,562 B1 | 2/2015 | Wurman et al. | |
| 9,008,828 B2 | 4/2015 | Worsley | |
| 9,008,829 B2 | 4/2015 | Worsley | |
| 9,008,830 B2 | 4/2015 | Worsley | |
| 9,009,072 B2 | 4/2015 | Mountz et al. | |
| 9,067,317 B1 | 6/2015 | Wurman et al. | |
| 9,087,314 B2 | 7/2015 | Hoffman et al. | |
| 9,090,400 B2 | 7/2015 | Wurman et al. | |
| 9,111,251 B1 | 8/2015 | Brazeau | |
| 9,129,251 B2 | 9/2015 | Davidson | |
| 9,216,857 B1 | 12/2015 | Kalyan et al. | |
| 2001/0020197 A1 | 9/2001 | Nakano et al. | |
| 2002/0021954 A1 | 2/2002 | Winkler | |
| 2002/0103725 A1 | 8/2002 | Martin et al. | |
| 2002/0165804 A1 | 11/2002 | Beebe et al. | |
| 2003/0036985 A1 | 2/2003 | Soderholm | |
| 2003/0040841 A1 | 2/2003 | Nasr et al. | |
| 2003/0135433 A1 | 7/2003 | Yan et al. | |
| 2003/0216969 A1 | 11/2003 | Bauer et al. | |
| 2003/0222141 A1 | 12/2003 | Vogler et al. | |
| 2003/0233293 A1 | 12/2003 | Hsu et al. | |
| 2004/0010337 A1 | 1/2004 | Mountz | |
| 2004/0010339 A1 | 1/2004 | Mountz | |
| 2004/0034581 A1 | 2/2004 | Hill et al. | |
| 2004/0093116 A1 | 5/2004 | Mountz | |
| 2004/0099735 A1 | 5/2004 | Neumark | |
| 2004/0111911 A1 | 6/2004 | Scannell | |
| 2004/0188523 A1 | 9/2004 | Lunak et al. | |
| 2005/0027620 A1 | 2/2005 | Taylor et al. | |
| 2005/0043850 A1 | 2/2005 | Stevens et al. | |
| 2005/0060246 A1 | 3/2005 | Lastinger et al. | |
| 2005/0087602 A1 | 4/2005 | Scannell | |
| 2005/0102203 A1 | 5/2005 | Keong | |
| 2005/0137943 A1 | 6/2005 | Holzman | |
| 2005/0149226 A1 | 7/2005 | Stevens et al. | |
| 2005/0206586 A1 | 9/2005 | Capurso et al. | |
| 2005/0230410 A1 | 10/2005 | DeLazzer et al. | |
| 2005/0234784 A1 | 10/2005 | McClellan et al. | |
| 2005/0238465 A1 | 10/2005 | Razumov | |
| 2005/0238467 A1 | 10/2005 | Minges | |
| 2005/0268987 A1 | 12/2005 | Rackers | |
| 2006/0085235 A1 | 4/2006 | Nguyen et al. | |
| 2006/0206235 A1 | 9/2006 | Shakes et al. | |
| 2006/0210382 A1 | 9/2006 | Mountz et al. | |
| 2006/0229887 A1 | 10/2006 | Liang et al. | |
| 2006/0259195 A1 * | 11/2006 | Eliuk | A61J 1/20 700/245 |
| 2007/0017984 A1 | 1/2007 | Mountz et al. | |
| 2007/0021031 A1 | 1/2007 | Madhani et al. | |
| 2007/0021863 A1 | 1/2007 | Mountz et al. | |
| 2007/0021864 A1 | 1/2007 | Mountz et al. | |
| 2007/0136152 A1 | 6/2007 | Dunsker et al. | |
| 2007/0140821 A1 | 6/2007 | Garon et al. | |
| 2007/0162360 A1 | 7/2007 | Congram et al. | |
| 2007/0187496 A1 | 8/2007 | Andersen et al. | |
| 2007/0239312 A1 | 10/2007 | Andersen et al. | |
| 2007/0288123 A1 | 12/2007 | D'Andrea et al. | |
| 2007/0290040 A1 | 12/2007 | Wurman et al. | |
| 2007/0293978 A1 | 12/2007 | Wurman et al. | |
| 2007/0294029 A1 | 12/2007 | D'Andrea et al. | |
| 2008/0001372 A1 | 1/2008 | Hoffman et al. | |
| 2008/0051984 A1 | 2/2008 | Wurman et al. | |
| 2008/0051985 A1 | 2/2008 | D'Andrea et al. | |
| 2008/0077511 A1 | 3/2008 | Zimmerman | |
| 2008/0166217 A1 | 7/2008 | Fontana | |
| 2008/0167884 A1 | 7/2008 | Mountz et al. | |
| 2008/0167933 A1 | 7/2008 | Hoffman et al. | |
| 2008/0181753 A1 | 7/2008 | Bastian et al. | |
| 2008/0216596 A1 | 9/2008 | Madhani et al. | |
| 2008/0228316 A1 | 9/2008 | Stevens et al. | |
| 2009/0037244 A1 | 2/2009 | Pemberton | |
| 2009/0074545 A1 | 3/2009 | Lert, Jr. et al. | |
| 2009/0149985 A1 * | 6/2009 | Chirnomas | B65G 1/1373 700/215 |
| 2009/0185884 A1 | 7/2009 | Wurman et al. | |
| 2009/0202854 A1 | 8/2009 | Jackson et al. | |
| 2009/0298603 A1 | 12/2009 | Crawford | |
| 2009/0299521 A1 | 12/2009 | Hansl et al. | |
| 2010/0174550 A1 | 7/2010 | Reverendo et al. | |
| 2010/0187306 A1 | 7/2010 | Solomon | |
| 2010/0227527 A1 | 9/2010 | Smoot et al. | |
| 2010/0250001 A1 | 9/2010 | Hodgins et al. | |
| 2010/0253919 A1 | 10/2010 | Douglas | |
| 2010/0259057 A1 | 10/2010 | Madhani | |
| 2010/0271654 A1 | 10/2010 | Prestenback et al. | |
| 2011/0015779 A1 | 1/2011 | D'Andrea et al. | |
| 2011/0029412 A1 | 2/2011 | Laughlin et al. | |
| 2011/0060449 A1 | 3/2011 | Wurman et al. | |
| 2011/0087354 A1 | 4/2011 | Tye et al. | |
| 2011/0103924 A1 | 5/2011 | Watt et al. | |
| 2011/0103925 A1 | 5/2011 | Welch et al. | |
| 2011/0112758 A1 | 5/2011 | D'Andrea et al. | |
| 2011/0125312 A1 | 5/2011 | D'Andrea et al. | |
| 2011/0130866 A1 | 6/2011 | D'Andrea et al. | |
| 2011/0130954 A1 | 6/2011 | D'Andrea et al. | |
| 2011/0153063 A1 | 6/2011 | Wurman et al. | |
| 2011/0153614 A1 | 6/2011 | Solomon | |
| 2011/0157155 A1 | 6/2011 | Turner et al. | |
| 2011/0158504 A1 | 6/2011 | Turner et al. | |
| 2011/0164030 A1 | 7/2011 | Gay et al. | |
| 2011/0200420 A1 | 8/2011 | Driskill et al. | |
| 2011/0231013 A1 | 9/2011 | Smoot et al. | |
| 2011/0248837 A1 | 10/2011 | Israr et al. | |
| 2011/0296944 A1 | 12/2011 | Carter et al. | |
| 2011/0304633 A1 | 12/2011 | Beardsley et al. | |
| 2012/0029683 A1 | 2/2012 | Keller et al. | |
| 2012/0029687 A1 | 2/2012 | Hagen et al. | |
| 2012/0030070 A1 | 2/2012 | Keller et al. | |
| 2012/0041677 A1 | 2/2012 | D'Andrea et al. | |
| 2012/0079606 A1 | 3/2012 | Evans et al. | |
| 2012/0084450 A1 | 4/2012 | Nagamati et al. | |
| 2012/0143374 A1 | 6/2012 | Mistry et al. | |
| 2012/0143427 A1 | 6/2012 | Hoffman et al. | |
| 2012/0173393 A1 | 7/2012 | Acuff et al. | |
| 2012/0185218 A1 | 7/2012 | Bickel et al. | |
| 2012/0282070 A1 | 11/2012 | D'Andrea et al. | |
| 2012/0323746 A1 | 12/2012 | Mountz et al. | |

(56) References Cited

U.S. PATENT DOCUMENTS

| | | |
|---|---|---|
| 2013/0054005 A1 | 2/2013 | Stevens et al. |
| 2013/0054021 A1 | 2/2013 | Murai et al. |
| 2013/0073087 A1 | 3/2013 | Irmler et al. |
| 2013/0079930 A1 | 3/2013 | Mistry et al. |
| 2013/0103185 A1 | 4/2013 | Wurman et al. |
| 2013/0103552 A1 | 4/2013 | Hoffman et al. |
| 2013/0121797 A1 | 5/2013 | Welch et al. |
| 2013/0131865 A1 | 5/2013 | Yamane |
| 2013/0145953 A1 | 6/2013 | Crawford et al. |
| 2013/0173049 A1 | 7/2013 | Brunner et al. |
| 2013/0204429 A1 | 8/2013 | D'Andrea et al. |
| 2013/0204480 A1 | 8/2013 | D'Andrea et al. |
| 2013/0204981 A1 | 8/2013 | Brundage et al. |
| 2013/0211977 A1 | 8/2013 | Lyon et al. |
| 2013/0231933 A1 | 9/2013 | Hajishirzi et al. |
| 2013/0238122 A1 | 9/2013 | Hodgins et al. |
| 2013/0246229 A1 | 9/2013 | Mountz et al. |
| 2013/0251480 A1 | 9/2013 | Watt et al. |
| 2013/0280493 A1 | 10/2013 | Jackson |
| 2013/0302132 A1 | 11/2013 | D'Andrea |
| 2013/0304253 A1 | 11/2013 | Wurman et al. |
| 2013/0321408 A1 | 12/2013 | Turner et al. |
| 2013/0340004 A1 | 12/2013 | Prestenback et al. |
| 2014/0046469 A1 | 2/2014 | Bickel et al. |
| 2014/0100690 A1 | 4/2014 | Wurman et al. |
| 2014/0100715 A1 | 4/2014 | Mountz et al. |
| 2014/0100999 A1 | 4/2014 | Mountz et al. |
| 2014/0135977 A1 | 5/2014 | Wurman et al. |
| 2014/0188671 A1 | 7/2014 | Mountz et al. |
| 2014/0195040 A1 | 7/2014 | Wurman et al. |
| 2014/0198948 A1 | 7/2014 | Sigal et al. |
| 2014/0214162 A1 | 7/2014 | Smoot et al. |
| 2014/0228999 A1 | 8/2014 | D'Andrea et al. |
| 2014/0232818 A1 | 8/2014 | Carr et al. |
| 2014/0236413 A1 | 8/2014 | D'Andrea et al. |
| 2014/0244026 A1* | 8/2014 | Neiser ............... B65G 1/1378 700/216 |
| 2014/0247116 A1 | 9/2014 | Davidson |
| 2014/0249670 A1 | 9/2014 | Yamane |
| 2014/0249693 A1 | 9/2014 | Stark et al. |
| 2014/0250526 A1 | 9/2014 | Khanna et al. |
| 2014/0257553 A1 | 9/2014 | Shakes et al. |
| 2014/0262690 A1* | 9/2014 | Henderson ............ B60M 1/305 198/602 |
| 2014/0270906 A1 | 9/2014 | Jackson |
| 2014/0277691 A1 | 9/2014 | Jacobus et al. |
| 2014/0292770 A1 | 10/2014 | Beardsley et al. |
| 2014/0294360 A1 | 10/2014 | Raptis et al. |
| 2014/0303773 A1 | 10/2014 | Wurman et al. |
| 2014/0309781 A1 | 10/2014 | Hodgins et al. |
| 2014/0324761 A1 | 10/2014 | Yedidia et al. |
| 2014/0330425 A1 | 11/2014 | Stevens et al. |
| 2014/0330426 A1 | 11/2014 | Brunner et al. |
| 2014/0343714 A1 | 11/2014 | Clark et al. |
| 2014/0350831 A1 | 11/2014 | Hoffman et al. |
| 2014/0358263 A1 | 12/2014 | Irmler et al. |
| 2014/0361077 A1 | 12/2014 | Davidson |
| 2015/0012396 A1 | 1/2015 | Puerini et al. |
| 2015/0019391 A1 | 1/2015 | Kumar et al. |
| 2015/0023490 A1 | 1/2015 | Jay et al. |
| 2015/0032252 A1* | 1/2015 | Galluzzo ............... B25J 5/007 700/218 |
| 2015/0032295 A1 | 1/2015 | Stark et al. |
| 2015/0073589 A1* | 3/2015 | Khodl .................. B25J 5/007 700/218 |
| 2015/0120514 A1 | 4/2015 | Deshpande et al. |
| 2015/0165624 A1 | 6/2015 | Keller et al. |
| 2015/0287262 A1 | 10/2015 | Smith et al. |
| 2015/0294395 A1 | 10/2015 | Deshpande et al. |
| 2015/0332213 A1 | 11/2015 | Galluzzo et al. |

FOREIGN PATENT DOCUMENTS

| | | |
|---|---|---|
| CA | 2654258 A1 | 12/2007 |
| CA | 2654260 A1 | 12/2007 |
| CA | 2654263 A1 | 12/2007 |
| CA | 2654336 A1 | 12/2007 |
| CA | 2654471 A1 | 12/2007 |
| CA | 2748398 A1 | 12/2007 |
| CA | 2748407 A1 | 12/2007 |
| CA | 2750043 A1 | 12/2007 |
| CA | 2781857 A1 | 12/2007 |
| CA | 2838044 A1 | 12/2007 |
| CA | 2866664 A1 | 12/2007 |
| CA | 2671955 A1 | 7/2008 |
| CA | 2673025 A1 | 7/2008 |
| CA | 2674241 A1 | 7/2008 |
| CA | 2703737 A1 | 5/2009 |
| CA | 2703740 A1 | 5/2009 |
| CA | 2754626 A1 | 9/2010 |
| CA | 2514523 C | 5/2011 |
| CA | 2778111 A1 | 5/2011 |
| CA | 2784874 A1 | 7/2011 |
| CA | 2868578 A1 | 7/2011 |
| CA | 2654295 C | 8/2013 |
| CN | 102096865 A | 6/2011 |
| CN | 202784514 U | 3/2013 |
| CN | 103108815 A | 5/2013 |
| CN | 103434784 A | 12/2013 |
| CN | 204660706 U | 9/2015 |
| DE | 10341313 A1 | 4/2005 |
| DE | 102008027646 A1 | 12/2009 |
| EP | 0037649 A2 | 10/1981 |
| EP | 0306787 B1 | 4/1994 |
| EP | 1122194 A1 | 8/2001 |
| EP | 1711241 A2 | 10/2006 |
| EP | 1799540 A2 | 6/2007 |
| EP | 1866856 A1 | 12/2007 |
| EP | 1920396 A2 | 5/2008 |
| EP | 2036012 A2 | 3/2009 |
| EP | 2036014 A2 | 3/2009 |
| EP | 2036024 A2 | 3/2009 |
| EP | 2038716 A2 | 3/2009 |
| EP | 2044495 A2 | 4/2009 |
| EP | 2047376 A2 | 4/2009 |
| EP | 2100264 A2 | 9/2009 |
| EP | 2102091 A1 | 9/2009 |
| EP | 2115620 A2 | 11/2009 |
| EP | 1590272 B1 | 8/2010 |
| EP | 2220859 A2 | 8/2010 |
| EP | 2233387 A1 | 9/2010 |
| EP | 2306744 A2 | 4/2011 |
| EP | 2306745 A2 | 4/2011 |
| EP | 2339497 A2 | 6/2011 |
| EP | 2363798 A1 | 9/2011 |
| EP | 2044494 B1 | 10/2011 |
| EP | 2411946 A1 | 2/2012 |
| EP | 2239106 B1 | 3/2012 |
| EP | 2471249 B1 | 7/2012 |
| EP | 2493794 A1 | 9/2012 |
| EP | 2499067 A2 | 9/2012 |
| EP | 2197561 B1 | 10/2012 |
| EP | 2407845 B1 | 4/2013 |
| EP | 2596922 A2 | 5/2013 |
| EP | 2619685 A1 | 7/2013 |
| EP | 2653281 A2 | 10/2013 |
| JP | 3395061 B2 | 4/2003 |
| JP | 3551599 B2 | 8/2004 |
| WO | 1999029467 A3 | 9/1999 |
| WO | 2004066124 A2 | 8/2004 |
| WO | 2004107616 A2 | 12/2004 |
| WO | 2005069755 A2 | 8/2005 |
| WO | 2005098706 A2 | 10/2005 |
| WO | 2006025235 A1 | 3/2006 |
| WO | 2006042347 A2 | 4/2006 |
| WO | 2006044108 A2 | 4/2006 |
| WO | 2006055925 A2 | 5/2006 |
| WO | 2007011814 A2 | 1/2007 |
| WO | 2007145749 A2 | 12/2007 |
| WO | 2007149194 A2 | 12/2007 |

(56) References Cited

FOREIGN PATENT DOCUMENTS

| | | | |
|---|---|---|---|
| WO | 2007149196 | A2 | 12/2007 |
| WO | 2007149227 | A2 | 12/2007 |
| WO | 2007149703 | A2 | 12/2007 |
| WO | 2007149711 | A2 | 12/2007 |
| WO | 2007149712 | A2 | 12/2007 |
| WO | 2008016899 | A2 | 2/2008 |
| WO | 2008085628 | A2 | 7/2008 |
| WO | 2008085638 | A2 | 7/2008 |
| WO | 2008085639 | A1 | 7/2008 |
| WO | 2008091733 | A2 | 7/2008 |
| WO | 2009036199 | A2 | 3/2009 |
| WO | 2009064775 | A1 | 5/2009 |
| WO | 2009064782 | A2 | 5/2009 |
| WO | 2009151797 | A2 | 12/2009 |
| WO | 2010110981 | A1 | 9/2010 |
| WO | 2011025824 | A1 | 3/2011 |
| WO | 2011059596 | A1 | 5/2011 |
| WO | 2011087583 | A2 | 7/2011 |
| WO | 2012040385 | A1 | 3/2012 |
| WO | 2013071150 | A1 | 5/2013 |
| WO | 2013121113 | A1 | 8/2013 |
| WO | 2013126048 | A1 | 8/2013 |
| WO | 2013134413 | A1 | 9/2013 |
| WO | 2013138193 | A2 | 9/2013 |
| WO | 2013173047 | A1 | 11/2013 |
| WO | 2014055716 | A1 | 4/2014 |
| WO | 2014077819 | A1 | 5/2014 |
| WO | 2014082043 | A2 | 5/2014 |
| WO | 2014116947 | A1 | 7/2014 |
| WO | 2014130937 | A1 | 8/2014 |

OTHER PUBLICATIONS

Peter Whitney et al. "A Low-Friction Passive Fluid Transmission and Fluid-Tendon Soft Actuator", IEEE/RSJ International Conference on Intelligent Robots and Systems (IROS) 2014, Sep. 14, 2014 (pp. 4) http//www.disneyresearch.com/publication/fluid-soft-actuator/.

"Active Shelf System—RFID Tracking for Retail Inventories", Barcoding Incorporated (pp. 2) http://www.barcoding.com/rfid/active-shelf.shtml.

"Competing robotic warehouse systems", The Robot Report, Apr. 30, 2015 by Frank Tobe (pp. 6) http://www.therobotreport.com/news/goods-to-man-robotic-systems.

"Hitachi warehouse robot grabs goods with two arms", Aug. 25, 2015 by Tim Hornyak (pp. 3) http://www.computerworld.com/article/2975349/robotics.hitachi-warehouse-robot-grabs-goods-with-two-arms.html.

* cited by examiner

TELEPRESENCE BASED INVENTORY PICK AND PLACE OPERATIONS THROUGH ROBOTIC ARMS AFFIXED TO EACH ROW OF A SHELF

CLAIM OF PRIORITY

This application is a Non-Provisional conversion application of and claims priority to the U.S. provisional application No. 62/145,488 titled TELEPRESENCE BASED INVENTORY PICK AND PLACE OPERATIONS THROUGH PNEUMATIC ROBOTIC ARMS AFFIXED TO EACH ROW OF A SHELF filed on Apr. 9, 2015.

FIELD OF TECHNOLOGY

This disclosure relates generally to robotics, and more particularly to a method, apparatus, and system of telepresence based inventory pick and place operations through robotic arms affixed to each row of a shelf.

BACKGROUND

A distribution center (e.g., a warehouse, a fulfillment center, a cross-dock facility, a bulk break center, an unstructured or structured storage area, and/or a package handling center) may be a physical space in which inventory (e.g., products) is temporarily stored and/or handled for downstream delivery to retailers or consumers. The distribution center may allow a single location to stock a number of products. Distribution centers may be located far from urban locations to secure lower costs or closer to where customers are located to facilitate same day and/or next day delivery (e.g., for e-commerce transactions), and may be in urban locations where costs of real estate per square foot is expensive. For this reason, the distribution center may be stacked high in a small space, with rows reaching ten (10) meters or more. Activities within manufacturing facilities may cover—picking of parts for assembly from a vertically stacked storage area with many high rows of shelving. In addition, some organizations may operate manufacturing and/or direct-to-consumer distribution in a single facility or interconnected facility to share investments (e.g., in space, equipment, labor resources, and/or inventory as applicable).

The distribution center may have a series of rows having stacked shelving. Items may be stored on these shelves. A warehouse management system (e.g., WMS system) may be used to identify and track inventory in the distribution center. A human lift may be required to pick items stored in a higher row of the shelf based on information from the warehouse management system. This may require repositioning of warehouse vehicles. In addition, a trained human operator may need to enter a lift basket and manually perform tasks such as picking items from higher shelves. This may result in significant labor expenses in training and skilled labor. Further, professional hazard insurances for workplace injury and occupational risks may be high as these tasks may be dangerous and accident prone. Therefore, the distribution center may operate inefficiently and may be expensive and/or hazardous to operate.

SUMMARY

Disclosed are a system and/or a method of telepresence based inventory pick and place operations through robotic arms affixed to each row of a shelf. In one aspect, a method includes mounting a robotic arm at an end of a row of a shelf of inventory on a set of rails affixed to the row of a shelf. The method further includes permitting the robotic arm to move horizontally along the three axes along the row of the shelf. The robotic arm is repositioned along the three axes using a set of actuators. The set of actuators are a backdrivable, an electrosensing, an electric, a magnetic, a hydraulic, and/or pneumatic actuators.

Further, the method includes contemporaneously mirroring a haptic motion of a human user that is remotely using a positioning device that is communicatively coupled with the robotic arm through an Internet network. The robotic arm is automatically repositioned along the three axes using the set of actuators responsive to the haptic motion of the human user that is remotely using the positioning device.

The method includes placing an item of inventory on a counting platform in front of the robotic arm using an end effector of the robotic arm (based on an action of a human that views the item of inventory) through a camera. The camera is affixed to the robotic arm which is communicatively coupled with a computing device associated with the human user operating the positioning device. The method includes moving the item of inventory to a designated location adjacent to the robotic arm using the end effector. The items are placed automatically in the designated location down through a transport means adjacent at one end of the shelf when a pick operation is completed. The designated location is a tote and/or a storage bin. The transport means is a tube and/or a lift platform to bring the tote from the designated location to a desired location of the shelf.

The method may include placing the item of inventory on a platform having an angled surface such that the storage bin in which the item of inventory is placed is angled upward and does not fall off the shelf when placed on the counting platform. In addition, the item of inventory may be validated based on a weight of an item on the counting platform. Also, the method may include a telepresence application to provide the positioning device control over the robotic arm remotely through the Internet network. The shelf may include a plurality of rows of the shelf and a plurality of robotic arms. Each of the rows of the shelf may include one and/or more robotic arms that horizontally traverse a particular row in which it is affixed.

Each of the robotic arms may coordinate with a warehouse management server to automatically direct the human user of the telepresence application to each location on the shelf associated with the items needed to be fulfilled in an e-commerce order. Each item of an e-commerce order may be automatically deposited through respective ones of the plurality of robotic arms into a packing box on a conveyor belt of a distribution center. The items may be deposited down through the tube adjacent to the one end of the shelf.

The telepresence application may detect that the human has completed a movement of the items onto the counting platform and/or directs the human user to a next one of a plurality of the robotic arms positioned in front of the storage bin where a selection is needed.

In addition, a neural network may automatically monitor a behavior of the human user. The neural network may continuously learn how to improve the pick and/or place of a particular type of item from the shelf such that, over time, a control program may learn how to control the robotic arm to automatically select the items onto the counting platform without a human intervention or a human haptic control.

The end effector of the robotic arm may be a supple rubber end point, a gripping arm, a sticky polymer end, an impactive end effector, an ingressive end effector, an astrictive end effector and/or a contigutive end effector. The robot may have two robotic arms with actuator control to permit the human user to grab and/or lift the items (e.g., the system may operate with two parts—compliance to prevent users and/or operators being injured and detection of objects). The robotic arm may safely operate around the human operators in a distribution center by slowly coming to a stop and/or not having to stop abruptly through compliance to prevent users and/or operators being injured (when an adjacent object is detected which is likely to obstruct a motion of the robotic arm).

In another aspect, a method of a telepresence application includes determining that a remote positioning device associated with a human user is communicatively coupled with the telepresence application. The method also includes validating the human user as an authorized user of the telepresence application using a processor and a memory of a warehouse management server. A robotic arm is automatically allocated in a distribution center that is assigned to the human user based on an e-commerce order.

In addition, the method includes contemporaneously repositioning the robotic arm along the three axes using a set of actuators (based on a mirrored haptic motion of the human user that is remotely using a positioning device). The method may provide a view of an item of inventory directly in front of the robotic arm to the human user who is remotely controlling the robotic arm through the positioning device. The robotic arm may place the item of inventory on a counting platform in front of the robotic arm using an end effector of the robotic arm based on an action of a human that views the item of inventory through a camera.

The camera may be affixed to the robotic arm which is communicatively coupled with a computing device associated with the human user operating the positioning device based on a place command from the telepresence application. Further, the robotic arm may validate the item of inventory (based on a weight of the item) on the counting platform based on a validate command from the telepresence application.

The robotic arm may move the item of inventory in a location (adjacent to the robotic arm) using the end effector based on a move command from the telepresence application. The method may include moving items at the location down through a tube adjacent to one end of the shelf when a pick operation is completed based on a complete command from the telepresence application.

A shelf may include a plurality of rows of the shelf and a plurality of robotic arms. Each of the rows of the shelf may include a different robotic arm. Each of the rows of the shelf may include one and/or more different robotic arms that horizontally traverse a particular row in which it is affixed.

In yet another aspect, a warehouse system includes a set of robotic arms that are each affixed to the individual rows of shelving in a distribution center to reposition horizontally along individual rows of shelving along the three axes using a set of actuators. The warehouse system also includes an Internet network. The warehouse system includes a warehouse management server having a telepresence application coupled with the set of robotic arms through the Internet network. The telepresence application provides remote control to a human user over each of a set of the robotic arms through the Internet network.

The system also includes a positioning device coupled with each of the set of robotic arms and the warehouse management server having the telepresence application through the Internet network. The set of robotic arms is haptically controlled by a human user in a manner such that a haptic motion of the human user of the positioning device is imitated through a mirrored repositioning of the set of robotic arms.

The methods and systems disclosed herein may be implemented in any means for achieving the various aspects, and may be executed in the form of a non-transitory machine-readable medium embodying a set of instructions that, when executed by a machine, cause the machine to perform any of the operations disclosed herein.

Other features will be apparent from the accompanying drawings and from the detailed description that follows.

BRIEF DESCRIPTION OF DRAWINGS

The embodiments of this invention are illustrated by way of example and not limitation in the figures of the accompanying drawings, in which like references indicate similar elements and in which.

Figure 1:
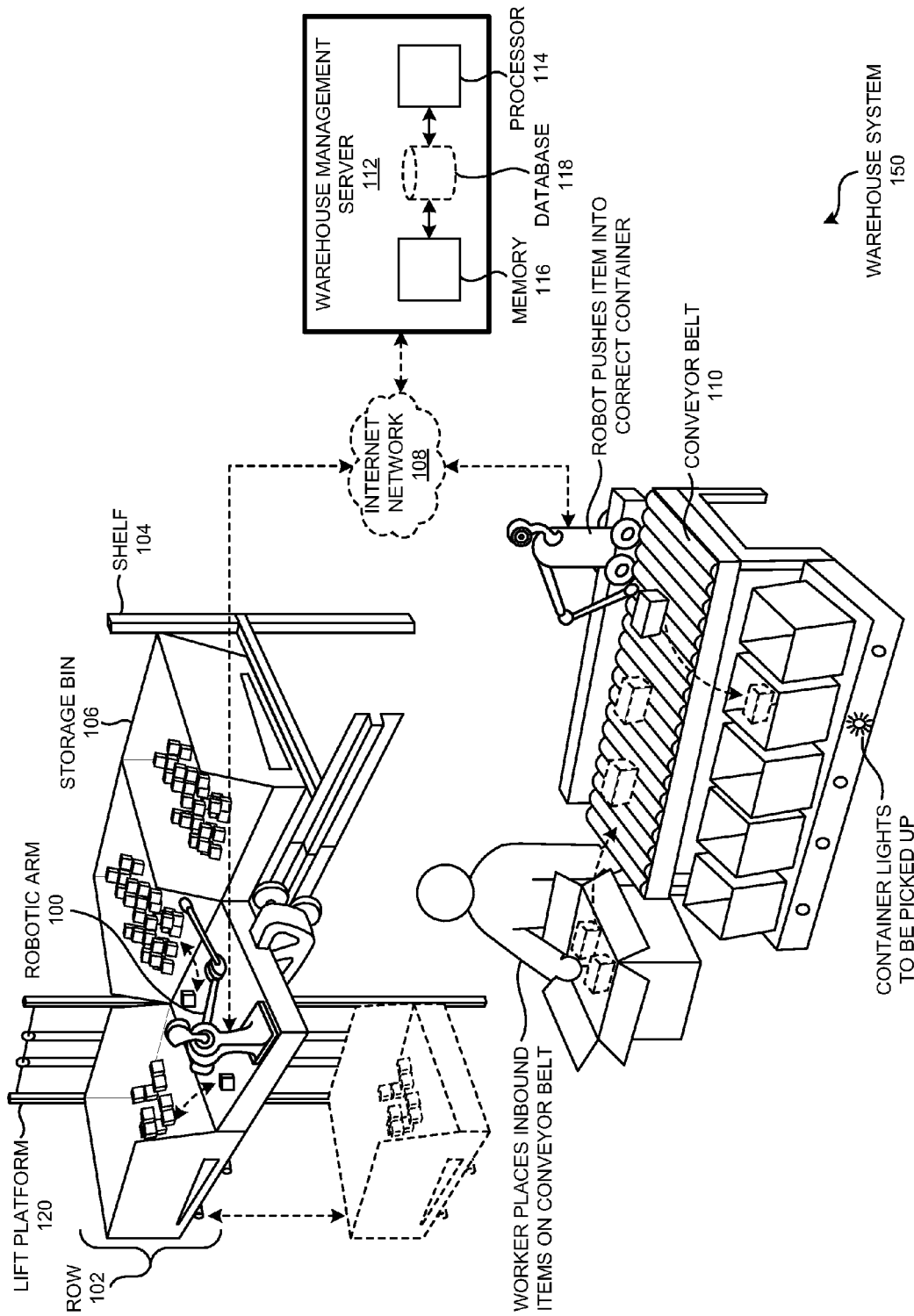
FIG. 1 is a schematic view of a warehouse system illustrating a set of robotic arms coupled with a warehouse management server through an Internet network, according to one embodiment.

Other features of the present embodiments will be apparent from the accompanying drawings and from the detailed description that follows.

DETAILED DESCRIPTION

Example embodiments, as described below, may be used to provide a method and/or system of telepresence based inventory pick and place operations through robotic arms affixed to each row of a shelf.

In one embodiment, a method includes mounting a robotic arm 100 at an end of a row 102 of a shelf of inventory (e.g., shelf 104) on a set of rails 202 affixed to the row 102 of a shelf 104. The method further includes permitting the robotic arm 100 to move horizontally along the three axes along the row 102 of the shelf 104. The robotic arm 100 is repositioned along the three axes using a set of actuators 204. The set of actuators 204 are a backdrivable, an electrosensing, an electric, a magnetic, a hydraulic, and/or pneumatic actuators.

Further, the method includes contemporaneously mirroring a haptic motion 402 of a human user 304 that is remotely using a positioning device 314 that is communicatively coupled with the robotic arm 100 through an Internet network 108. The robotic arm 100 is automatically repositioned along the three axes using the set of actuators 204 responsive to the haptic motion 402 of the human user 304 that is remotely using the positioning device 314.

The method includes placing an item of inventory 206 on a counting platform 208 in front of the robotic arm 100 using an end effector 210 of the robotic arm 100 (based on an action of a human user 304 that views the item of inventory 206) through a camera (e.g., camera for remote human user 212). The camera (e.g., camera for remote human user 212) is affixed to the robotic arm 100 which is communicatively coupled with a computing device 302 associated with the human user 304 operating the positioning device 314 (e.g., positioning arm, data gloves). The method includes moving the item of inventory 206 to a designated location adjacent to the robotic arm 100 using the end effector 210. The items 218 are placed automatically in the designated location down through a transport means 706 adjacent at one end of the shelf 104 when a pick operation 608 is completed. The designated location is a tote 214 and/or a storage bin 106. The transport means 706 is a tube and/or a lift platform 120 to bring the tote 214 from the designated location (e.g., tote 214, storage bin 106) to a desired location (e.g., on the conveyor belt 110) of the distribution center.

The method may include placing the item of inventory 206 on a platform 216 having an angled surface such that a storage bin 106 in which the item of inventory 206 is placed is angled upward and does not fall off the shelf 104 when placed on the counting platform 208. In addition, the item of inventory 206 may be validated using validation function 310 based on a weight of an item (e.g., item of inventory 206) on the counting platform 208. Also, the method may include a telepresence application 312 to provide the positioning device 314 (e.g., positioning arm, data gloves) control over the robotic arm 100 remotely through the Internet network 108. The shelf 104 may include a plurality of rows (e.g., row 102) of the shelf 104 and a plurality of robotic arms (e.g., robotic arm 100). Each of the rows (e.g., row 102) of the shelf 104 may include one and/or more robotic arms (e.g., robotic arm 100) that horizontally traverse a particular row (e.g., row 102) in which it is affixed.

Each of the robotic arms (e.g., robotic arm 100) may coordinate with a warehouse management server 112 to automatically direct the human user 304 of the telepresence application 312 to each location on the shelf 104 associated with the items 218 needed to be fulfilled in an e-commerce order. Each item (e.g., item of inventory 206) of an e-commerce order may be automatically deposited through respective ones of the plurality of robotic arms (e.g., robotic arm 100) on a conveyor belt 110 of a distribution center. The items 218 may be deposited down through the transport means 706 (e.g., a tube) adjacent to the one end of the shelf 104.

The telepresence application 312 may detect that the human (e.g., human user 304) has completed a movement of the items 218 onto the counting platform 208 and/or directs the human user 304 to a next one of a plurality of the robotic arms (e.g., robotic arm 100) positioned in front of a storage bin 106 where a selection is needed.

In addition, a neural network 306 may automatically monitor a behavior of the human user 304. The neural network 306 may continuously learn how to improve the pick and/or place of a particular type of item (e.g., item of inventory 206) from the shelf 104 such that, over time, a control program may learn how to control the robotic arm 100 to automatically select the items 218 onto the counting platform 208 without a human intervention or a human haptic control.

The end effector 210 of the robotic arm 100 may be a supple rubber end point, a gripping arm, a sticky polymer end, an impactive end effector, an ingressive end effector, an astrictive end effector and/or a contigutive end effector. The robot 702 may have two robotic arms 704 with actuator control to permit the human user 304 to grab and/or lift the items 218 (e.g., the system may operate with two parts—compliance to prevent users and/or operators being injured, hurt, or killed and detection of objects). The robotic arm 100 may safely operate around the human operators in a distribution center by slowly coming to a stop and/or not having to stop abruptly through compliance to prevent users and/or operators being injured (when an adjacent object is detected which is likely to obstruct a motion of the robotic arm 100).

In another embodiment, a method of a telepresence application 312 includes determining that a remote positioning device 314 (e.g., positioning arm, data gloves) associated with a human user 304 is communicatively coupled with the telepresence application 312. The method also includes validating (using validation function 310) the human user 304 as an authorized user of the telepresence application 312 using a processor 114 and a memory 116 of a warehouse management server 112. A robotic arm 100 is automatically allocated in a distribution center that is assigned to the human user 304 based on an e-commerce order.

In addition, the method includes contemporaneously repositioning the robotic arm 100 along the three axes using a set of actuators 204 (based on a mirrored haptic motion 402 of the human user 304 that is remotely using a positioning device 314). The method may provide a view (through the camera for remote human user 212) of an item of inventory 206 directly in front of the robotic arm 100 to the human user 304 (on the display screen 406) who is remotely controlling the robotic arm 100 through the positioning device 314. The robotic arm 100 may place the item of inventory 206 on a counting platform 208 in front of the robotic arm 100 using an end effector 210 of the robotic arm 100 based on an action (haptic motion 402) of a human (e.g., human user 304) that views the item of inventory 206 through a camera (e.g., camera for remote human user 212).

The camera (e.g., camera for remote human user 212) may be affixed to the robotic arm 100 which is communicatively coupled to a computing device 302 associated with the human user 304 operating the positioning device 314 (e.g., positioning arm, data gloves) based on a place command from the telepresence application 312.

The robotic arm 100 may move the item of inventory in a location (adjacent to the robotic arm 100) using the end effector 210 based on a move command from the telepresence application 312. The method may include moving the items 218 in the location (e.g., on the conveyor belt 110) down through a tube (e.g., a lift platform 120) adjacent to one end of the shelf 104 when a pick operation 608 is completed based on a complete command from the telepresence application 312.

A shelf 104 may include a plurality of rows (e.g., row 102) of the shelf 104 and a plurality of robotic arms (e.g., robotic arm 100). Each of the rows (e.g., row 102) of the shelf 104 may include a different robotic arm 100. Each of the rows of the shelf 104 may include one and/or more different robotic arms (e.g., robotic arm 100) that horizontally traverse a particular row (e.g., row 102) in which it is affixed.

In yet another embodiment, a warehouse system 150 includes a set of robotic arms (e.g., robotic arm 100) that are each affixed to individual rows (e.g., row 102) of shelving in a distribution center to reposition horizontally along individual rows of shelving along the three axes using a set of actuators 204. The system also includes an Internet network 108. The warehouse system includes a warehouse management server 112 having a telepresence application 312 coupled with the set of robotic arms (e.g., robotic arm 100) through the Internet network 108. The telepresence application 312 provides remote control to a human user 304 over each of a set of the robotic arms through the Internet network 108.

The system also includes a positioning device 314 coupled with each of the set of robotic arms (e.g., robotic arm 100) and the warehouse management server 112 having the telepresence application 312 through the Internet network 108. The set of robotic arms (e.g., robotic arm 100) is haptically controlled by a human user 304 in a manner such that a haptic motion 402 of the human user 304 of the positioning device 314 is imitated through a mirrored repositioning of the set of robotic arms (e.g., robotic arm 100).

FIG. 1 is a schematic view of a warehouse system 150 illustrating a set of robotic arms (e.g., robotic arm 100) coupled with a warehouse management server 112 through an Internet network 108, according to one embodiment. Particularly, warehouse system 150 shows a robotic arm 100, a row 102, a shelf 104, a storage bin 106, Internet network 108, a conveyor belt 110, a warehouse management server 112, a processor 114, a memory 116, database 118, and a lift platform 120, according to one embodiment.

A robotic arm 100 may be a type of electro-mechanical arm designed to execute pick, move, and/or place operations. A robotic arm 100 may be designed to be operated and/or controlled by a human user 304. Conversely, the robotic arm 100 may be programmed and then left alone to repeat their tasks independent of the control of human user 304. The row 102 may be a horizontal section of the shelf of inventory (e.g., shelf 104) usually used to occupy storage bin 106 filled with the items 218, according to one embodiment.

The shelf 104 may be rectangular structure with horizontal slab used in the distribution centers to provide a surface to hold the items 218 for display, storage and/or offer for an e-commerce sale. An Internet network 108 may be a group of computing devices (e.g., hardware and software) that are linked together through communication channels (e.g., wired, wireless) to facilitate communication in the distribution centers. The storage bin 106 may be an open container on the shelf 104 where the items 218 can be stored, according to one embodiment.

The conveyor belt 110 may be a continuous moving surface that transports packing box from one place to another in the distribution center. The warehouse management server 112 may be a computer on which the program (e.g., telepresence application 312) runs. The warehouse management server 112 may be capable of accepting requests from the human user 304 who is operating the telepresence application 312 and respond accordingly, according to one embodiment.

A processor 114 may be a central unit of the warehouse management server 112 containing the logic circuitry to perform all the basic instructions of a computer program (e.g., telepresence application 312). The memory 116 may be an electronic holding place for instructions, information, and/or data temporarily or permanently that the processor 114 needs. The database 118 may be a collection of information that is organized so that it can easily be accessed, managed, and/or updated. A lift platform 120 attached to the one end of the shelf 104 may be an elevator that raises and/or lowers to transport the items 218 between different levels in the shelf 104, according to one embodiment.

FIG. 1 illustrates the set of robotic arms (e.g., robotic arm 100) communicatively coupled to the warehouse management server 112 through an Internet network 108. The warehouse management server 112 may include a database 118 coupled with the processor 114 and memory 116, according to one embodiment.

Figure 2:
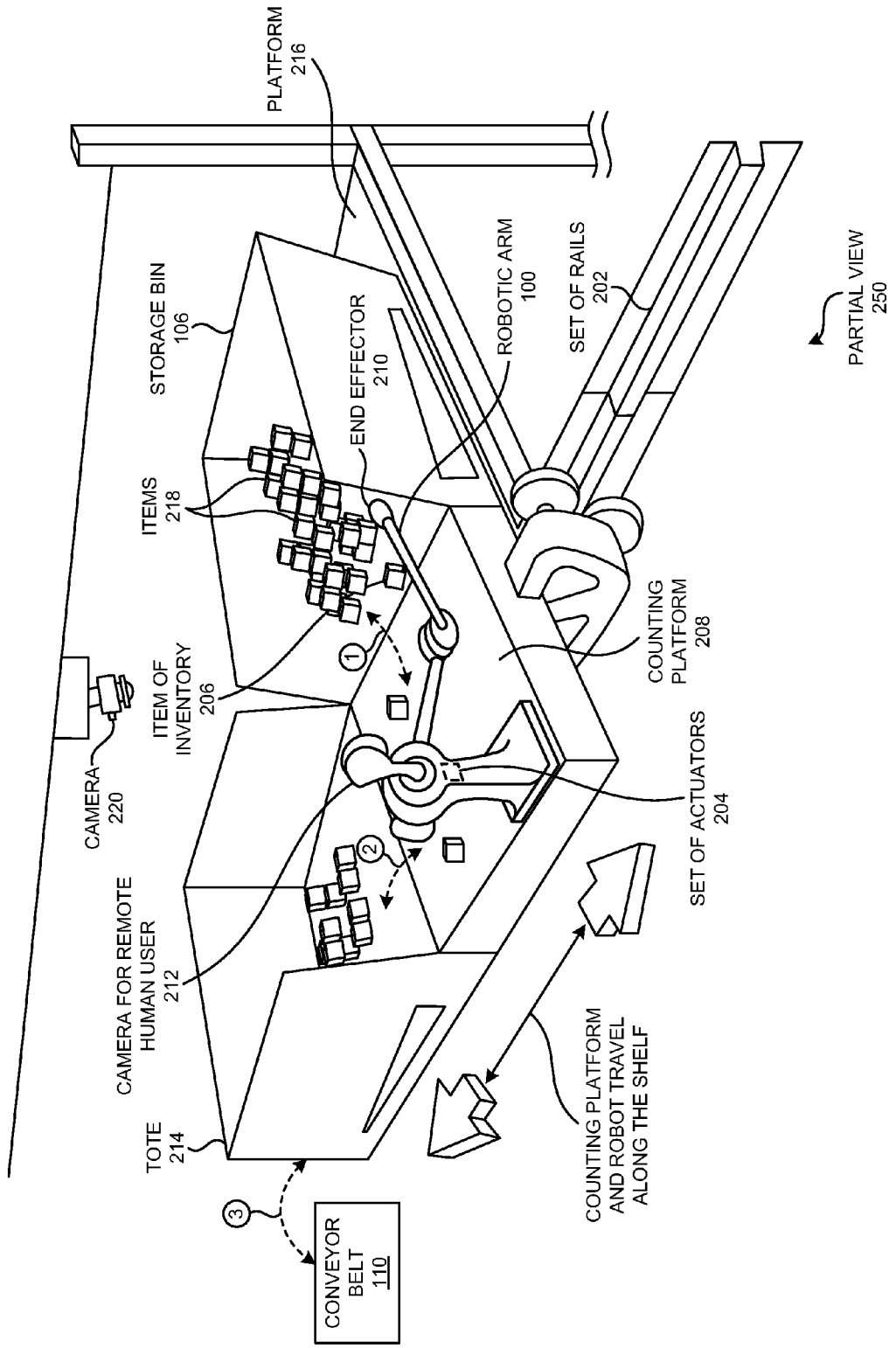
FIG. 2 is a partial view of FIG. 1 illustrating the motion of a robotic arm, according to one embodiment.

FIG. 2 is a partial view 250 of FIG. 1 illustrating the motion of a robotic arm 100, according to one embodiment. Particularly, partial view 250 shows a set of rails 202, a set of actuators 204, an item of inventory 206, a counting platform 208, an end effector 210, a camera for remote human user 212, tote 214, a platform 216, items 218, and camera 220, according to one embodiment.

The set of rails 202 may be a horizontal bar of metal affixed across the rows (e.g., row 102) of the shelf 104 supported by a framing member at the two ends of the row 102 that serve as a guide and/or running surface for the robotic arm 100. The set of actuators 204 may be a mechanical device that converts electrical, chemical, and/or thermal energy into a mechanical energy (e.g., physical motion). The physical motion may be linear and/or rotary motion. The set of actuators 204 may be used in the robots (e.g., robot 702) for providing the power to the robot joints and/or robotic arm 100, according to one embodiment.

The robotic arm 100 may be activated by a backdrivable, an electrosensing, an electric, a magnetic, a hydraulic, and/or pneumatic actuators. A backdrivable actuator may be an electro-mechanical device for actively moving and/or driving the robotic arm 100 with high force sensitivity and/or high impact resistance which adapts to quick external force mechanically. Backdrivability may be essential for safe operation of robotic arm 100 around people, operating in unstructured environments (e.g., distribution center, warehouse) for stable control of contact forces. A pneumatic actuator may be an electro-mechanical device activated, controlled, and/or powered by air and/or gas pressure, according to one embodiment. In one alternate embodiment, a wide range of any type of compliant actuators may be utilized when activating the robotic arm 100.

An item of inventory 206 may refer to the goods being sold in an e-commerce order. A counting platform 208 may be a weighing platform to calculate the weight of the item of inventory 206. The counting platform 208 may have same level as that of the storage bin 106, according to one embodiment. An end effector 210 may be a device and/or a tool connected at the end of a robotic arm 100 that interacts with the work environment and/or executes an action. The end effector 210 may be a supple rubber end point, a gripping arm, a sticky polymer end, an impactive end effector, an ingressive end effector, an astrictive end effector, and/or a contigutive end effector, according to one embodiment.

A camera for remote human user 212 may be an optical instrument mounted at one of the joints of the robotic arm 100 that provides close-up view of the items 218 inside the storage bin 106 to the human user 304 through display screen 406. A tote 214 (e.g., designated location) may be a container to hold an item of inventory 206 and/or items 218. A tote 214 may be a tilted removable tote and/or bucket in one alternate embodiment. The platform 216 may be a raised surface which holds the storage bin 106. The platform 216 may be angled upward so that the items 218 does not fall off the shelf 104 during the pick and/or place operation, according to one embodiment.

The items 218 may be the collection of finished goods (e.g., item of inventory 206) placed in the storage bin 106 for ecommerce. A camera 220 may be an optical device mounted at the top of the row 102 just above the storage bin 106 to provide a close up view to the human user 304, according to one embodiment.

In circle '1', the item of inventory 206 is placed on a counting platform 208 using an end effector 210 based on a haptic motion 402 of the human user 304 that is remotely operating the positioning device 314 (e.g., positioning arm, data gloves), according to one embodiment. In circle '2', the item of inventory 206 is moved into a designated location (e.g., tote 214, storage bin 106) adjacent to the robotic arm 100 using the end effector 210, according to one embodiment. In circle '3', the items 218 are placed automatically in the desired location (e.g., conveyor belt 110) down through a transport means 706 (e.g., lift platform 120, tube) adjacent to one end of the shelf 104 when a pick operation 608 is completed, according to one embodiment. The transport means 706 may be a bidirectional, up and down capable lift platform 120.

Figure 3:
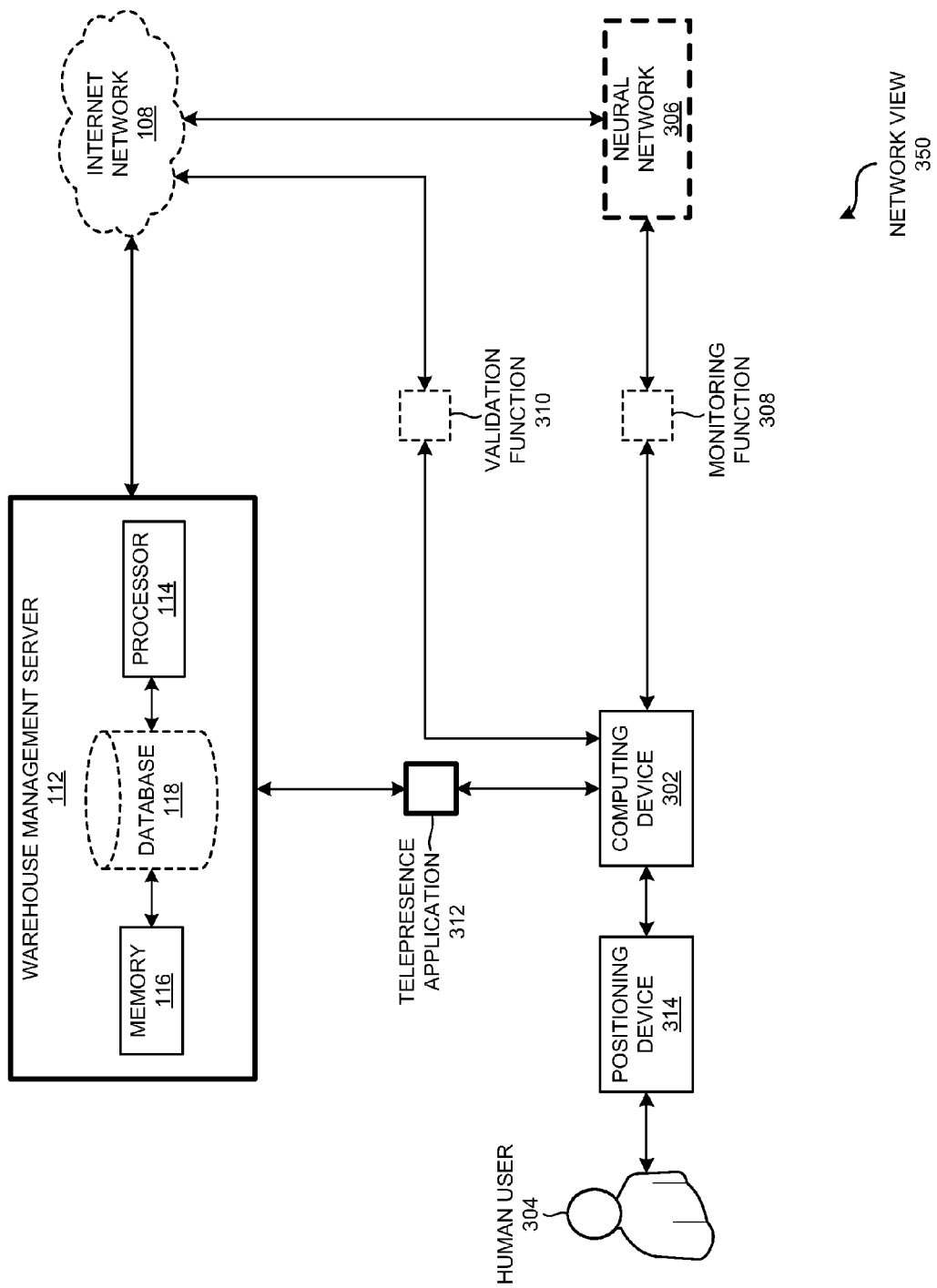
FIG. 3 is a network view illustrating the authentication and monitoring of a human user, according to one embodiment.

FIG. 3 is a network view 350 illustrating the authentication and monitoring of a human user 304, according to one embodiment. Particularly, network view 350 shows computing device 302, a human user 304, neural network 306, monitoring function 308, validation function 310, telepresence application 312, and positioning device 314, according to one embodiment.

The computing device 302 may be a data processing system (e.g., as described in FIG. 12) to automatically perform various functions. The functions may include pick and/or place operation of the item of inventory 206 from the shelf 104 as instructed by the human user 304 that is using a positioning device 314 (e.g., positioning arm, data gloves) to move the robotic arm 100 in a particular way. A human user 304 may be an authorized entity that uses the telepresence application 312 and/or directs the robotic arm 100 to pick and/or place the items 218, according to one embodiment.

The neural network 306 may be a system of programs and/or data structures that approximates the operation of the brain of human user 304 and nervous system. The monitoring function 308 may be a set of instructions that performs a specific task of supervising the behavior of the human user 304 that performs the haptic motion 402. In one embodiment, a human user 304 can also feel the feedback of the remote robotic arm 100 as it touches the objects (e.g., items 218) at the remote side. The neural network 306 may continuously learn how to better pick and/or place a particular type of item (e.g., item of inventory 206) from the shelf 104. The control program may learn how to control the robotic arm 100 to automatically select the items 218 onto the counting platform 208 without human intervention or human haptic control, according to one embodiment. In one embodiment, the puppeteer (e.g., the human user 304) can "feel" the puppet stick's feedback (e.g., the vibration or limit of motion as it contacts something solid at the remote end). This feedback may give the puppeteer (e.g., the human user 304) the feeling of holding the actual stick live. In one embodiment, this feedback may be critical to the human user 304 being able to control the arm fluidly.

In another embodiment, a minimum latency delay may be preset based on average round trip so that the remote latency, even if it's long, is consistent 100% of the time. For example, according to one embodiment, if the puppeteer is 300 ms behind the remote puppet, then they may be able to learn to react correctly (e.g., think Pac-Man® and how you know you have to push the stick to turn a good 250-500 ms before you get to the turn). In one embodiment, the entire experience feels like a video game and that the best users may also be skilled at video game eye-hand coordination.

The validation function 310 may be a set of instructions that performs a specific task of computing the weight of the item of inventory 206 on the counting platform 208. The validation function 310 may improve error-proofing and/or productivity in the picking process. Further, the validation function 310 may authenticate the human user 304 as an authorized user of the telepresence application 312 using a processor 114 and a memory 116 of a warehouse management server 112, according to one embodiment.

The telepresence application 312 may be software program operating on the warehouse management server 112 designed to perform a specific function as directed by the human user 304. The functions may include identifying that the human user 304 has finished the movement of items 218 (e.g., item of inventory 206) and/or instructs the human user 304 to the next order of eCommerce, according to one embodiment.

The positioning device 314 (e.g., positioning arm, data gloves) may be a body suit and/or device that fit's over the user's (e.g., human user 304) hand. The positioning device 314 may be controlled by a human user 304 remotely, according to one embodiment. The human user 304 may apply a sense of touch through vibrations, motion, and/or force that controls and/or interacts with the robotic arm 100 to perform the pick and/or place operations. The haptic motion 402 may be replicated by the robotic arm 100 through an Internet network 108. The positioning device 314 may act as a transmitter and the robotic arm 100 may act as a receiver in the warehouse system 150, according to one embodiment.

FIG. 3 illustrates a warehouse management server 112 including a database 118 coupled with the processor 114 and memory 116, according to one embodiment. The warehouse management server 112 may be communicatively coupled to the neural network 306 through the Internet network 108. The human user 304 may be remotely coupled with the positioning device 314. The computing device 302 may be associated with the human user 304. The telepresence application 312 may operate on the warehouse management server 112, according to one embodiment.

Figure 4:
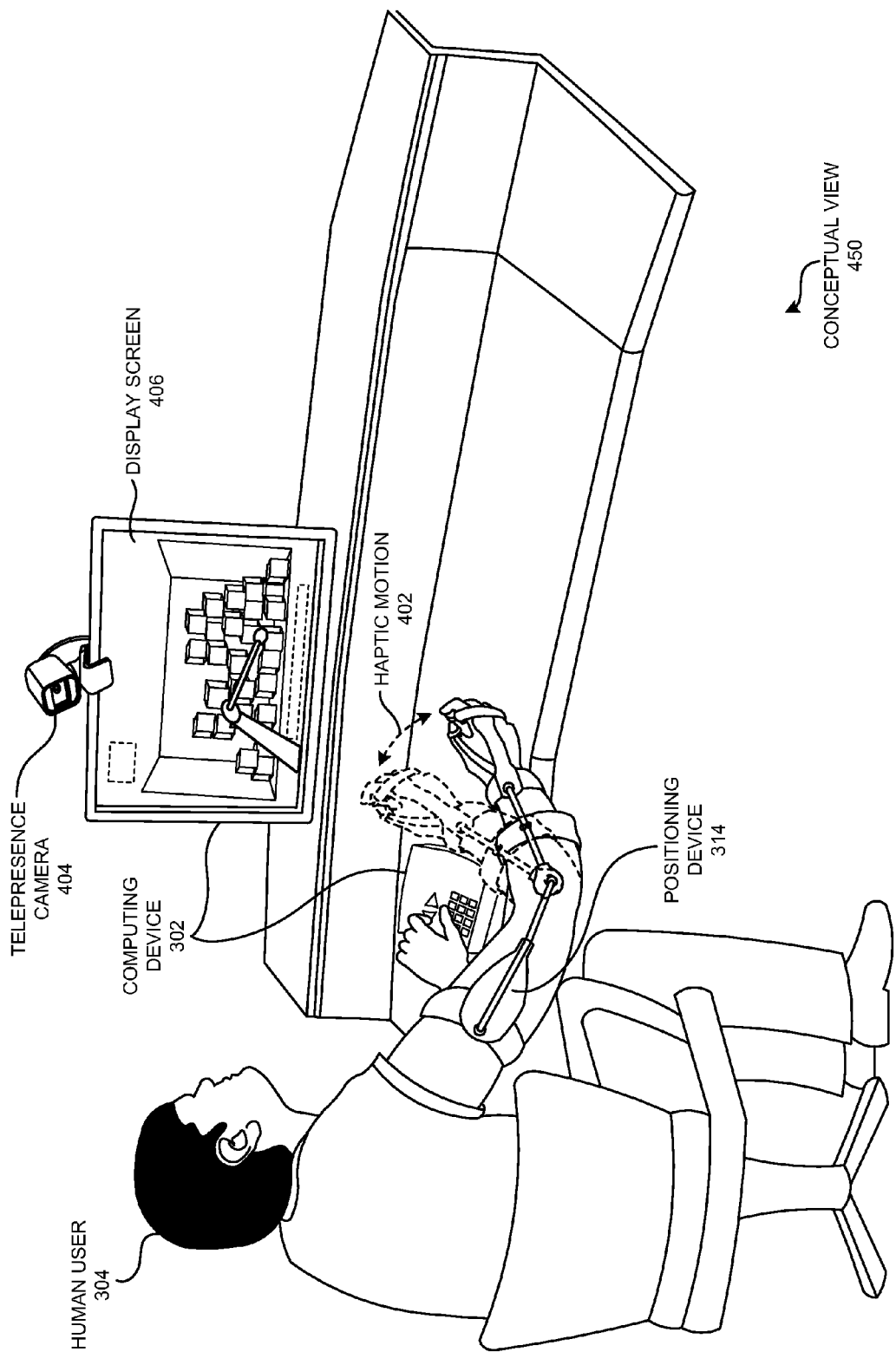
FIG. 4 is a conceptual view illustrating the mirroring of a haptic motion of the human user that is using a positioning device, according to one embodiment.

FIG. 4 is a conceptual view 450 illustrating the mirroring of a haptic motion 402 of a human user 304 that is using a positioning device 314, according to one embodiment. Particularly, conceptual view 450 shows a haptic motion 402, telepresence camera 404, and display screen 406, according to one embodiment.

The haptic motion 402 may be a form of interaction that includes the movement of hands and/or other parts of the human (e.g., human user 304) body. The haptic motion 402 may act as an input to the positioning device 314 (e.g., positioning arm, data gloves) by which the robotic arm 100 may perform the pick and/or place operation, according to one embodiment.

The computing device 302 may be a programmable electronic device designed to accept data (e.g., instructions given by the human user 304 that is using positioning device 314), perform prescribed operations (e.g., placing, validating, and/or moving the item of inventory 206), and display the results (as seen on the display screen 406). The telepresence camera 404 may be an optical instrument mounted on the monitor that captures and/or records the haptic motion 402 of the human user 304 with a high level of flexibility, according to one embodiment.

The display screen 406 may be a display part of a monitor that helps the human user 304 to push, pull, pick, and/or place the intended item of inventory 206 from the items 218 stored in the storage bin 106 through a camera (e.g., camera for remote human user 212) affixed to the robotic arm 100, according to one embodiment.

Figure 5:
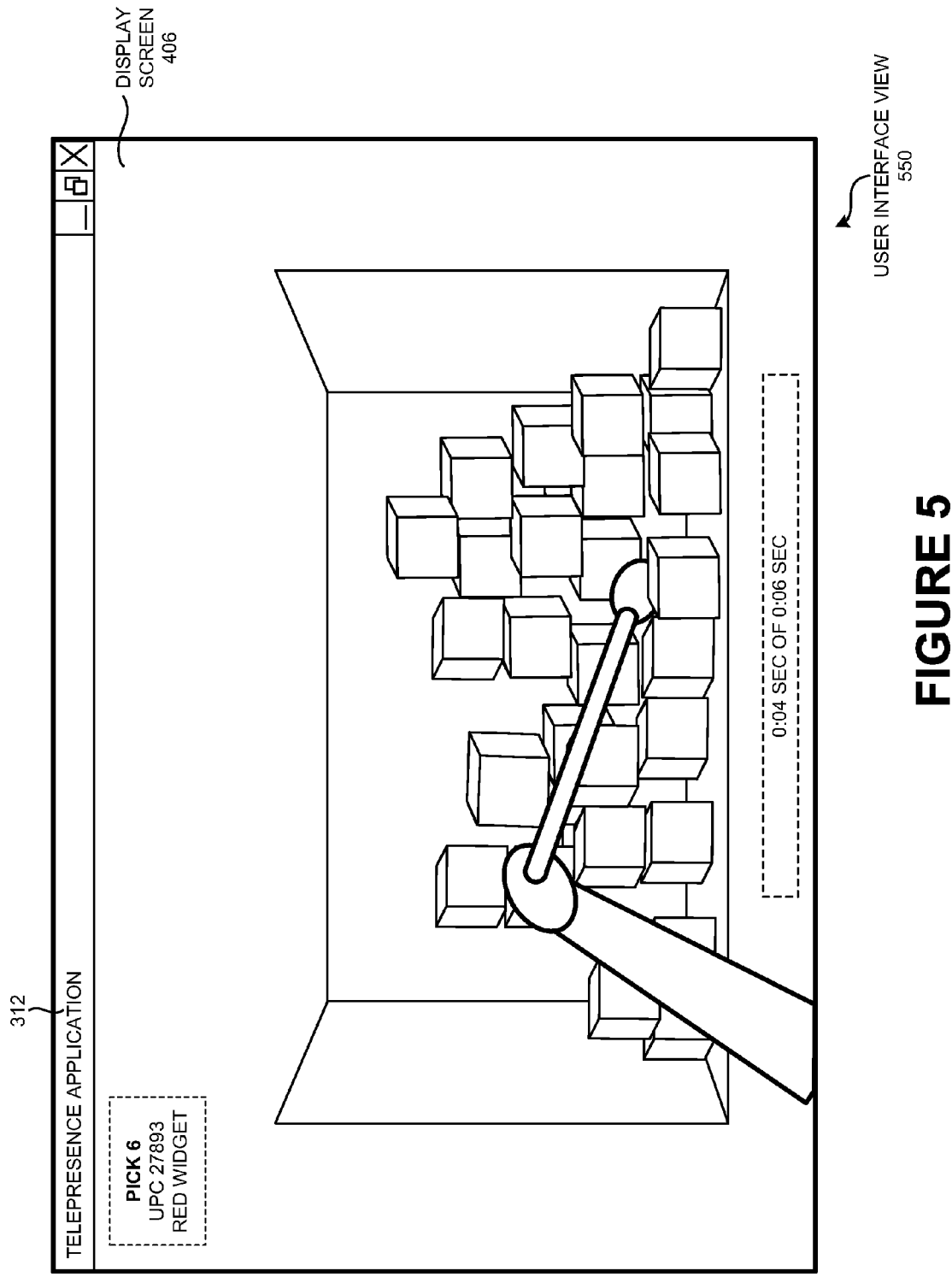
FIG. 5 is a user interface view showing a display screen of FIG. 4, according to one embodiment.

FIG. 5 is a user interface view 550 showing the display screen 406 of the telepresence application 312, according to one embodiment. In another embodiment, the display screen 406 may display the Universal Product Code (UPC) of the item of inventory 206. The display screen 406 may also show the snapshot taken at a particular instant of time, according to one embodiment.

Figure 6:
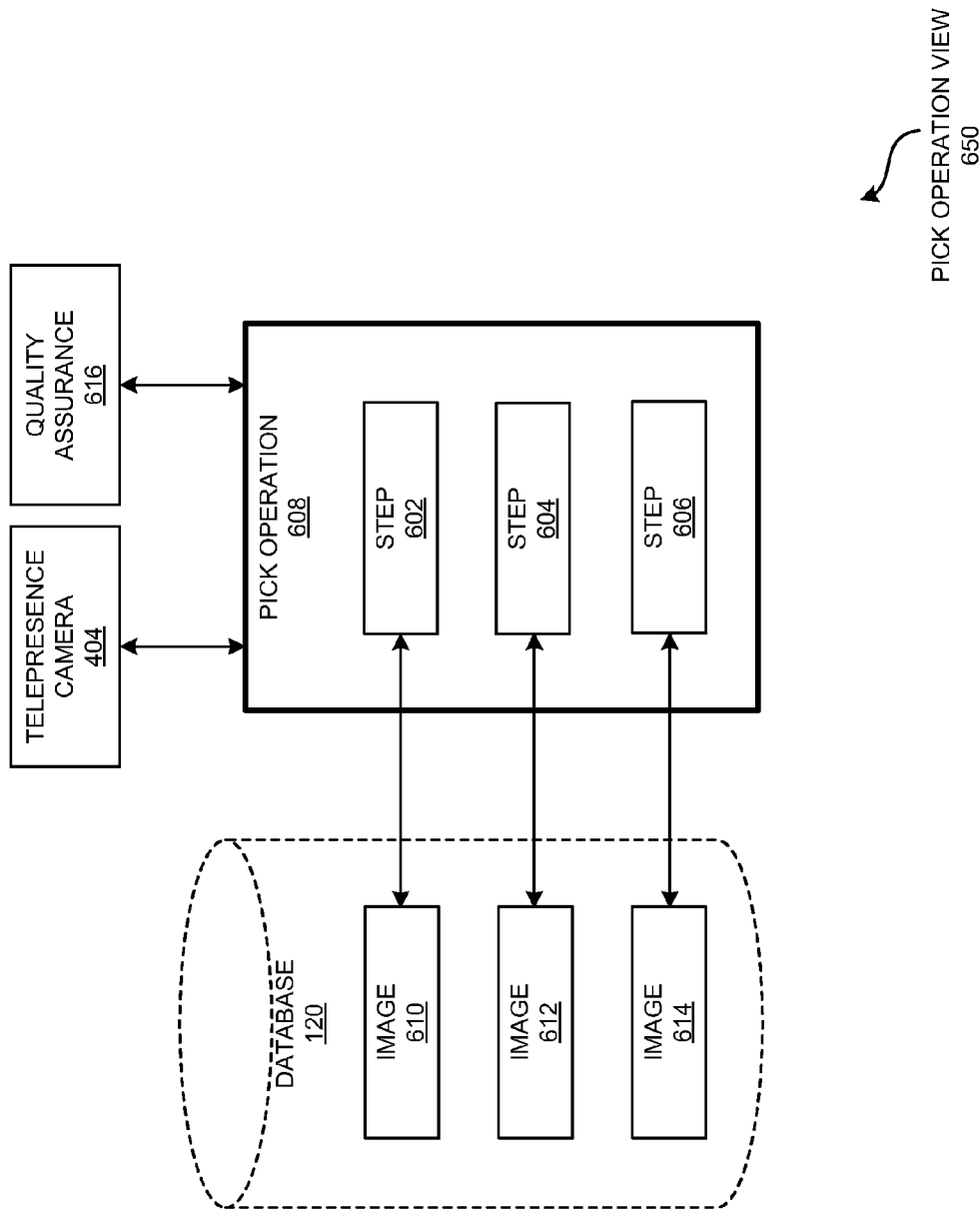
FIG. 6 is a pick operation view, according to one embodiment.

FIG. 6 is a pick operation view 650, according to one embodiment. Particularly, pick operation view 650 shows step 602, step 604, step 606, pick operation 608, image 610, image 612, image 614, and quality assurance 616, according to one embodiment.

The step 602 may be an action and/or movement (e.g., haptic motion 402) performed by the human user 304 that is using the positioning device 314 (e.g., positioning arm, data gloves) prior to the pick and/or place operation of the item of inventory 206 from the storage bin 106 and/or tote 214. The step 604 may be an action and/or movement (e.g., haptic motion 402) performed by the human user 304 that is using the positioning device 314 (e.g., positioning arm, data gloves) during the pick and/or place operation of the item of inventory 206 from the storage bin 106 and/or tote 214, according to one embodiment.

The step 606 may be an action and/or movement (e.g., haptic motion 402) performed by the human user 304 that is using the positioning device 314 (e.g., positioning arm, data gloves) after the pick and/or place operation of the item of inventory 206 from the storage bin 106 and/or tote 214. The pick operation 608 may involve various instants (e.g., step 602, step 604, step 606) in which the item of inventory 206 may be lifted by the robotic arm 100, according to one embodiment.

The image 610 may be a visible impression captured by the telepresence camera 404 after performing the step 602 by the human user 304 who is operating the positioning device 314. The image 612 may be a visible impression captured by the telepresence camera 404 after performing the step 604 by the human user 304 who is operating the positioning device 314. The image 614 may be a visible impression captured by the telepresence camera 404 after performing the step 606 by the human user 304 who is operating the positioning device 314, according to one embodiment.

The quality assurance 616 may be a process-centered approach ensuring that the robotic arm 100, positioning device 314, and/or the human user 304 are meeting the specified requirements. The quality assurance 616 may also check the random samples of stocks (e.g., items 218) to improve the work process and/or efficiency of the warehouse system 150. The steps (e.g., step 602, step 604, and step 606) may form the basis for a high quality training dataset for the warehouse system 150 to build a neural network 306. The training dataset may be used to train the neural network 306 to identify certain picks and/or moves that robotic arm 100 can do itself. The neural network 306 may become facile with certain picks and/or moves. The neural network 306 may intercept control of the robotic arm 100 from the human user 304 in the telepresence system, according to one embodiment.

FIG. 6 illustrates the database 118 storing image 610, image 612, and image 614. The pick operation 608 may include step 602, step 604, and step 606. The telepresence camera 404 may be communicatively coupled to the pick operation 608 as performed by the human user 304 who is operating the positioning device 314. The quality assurance 616 may be associated with the pick operation 608. The telepresence camera 404 may record the step 602 and associate it with the image 610 before the pick operation 608. The telepresence camera 404 may record the step 604 and associate it with image 612 during the pick operation 608. The telepresence camera 404 may record the step 606 and associate it with the image 614 after the pick operation 608, according to one embodiment.

Figure 7:
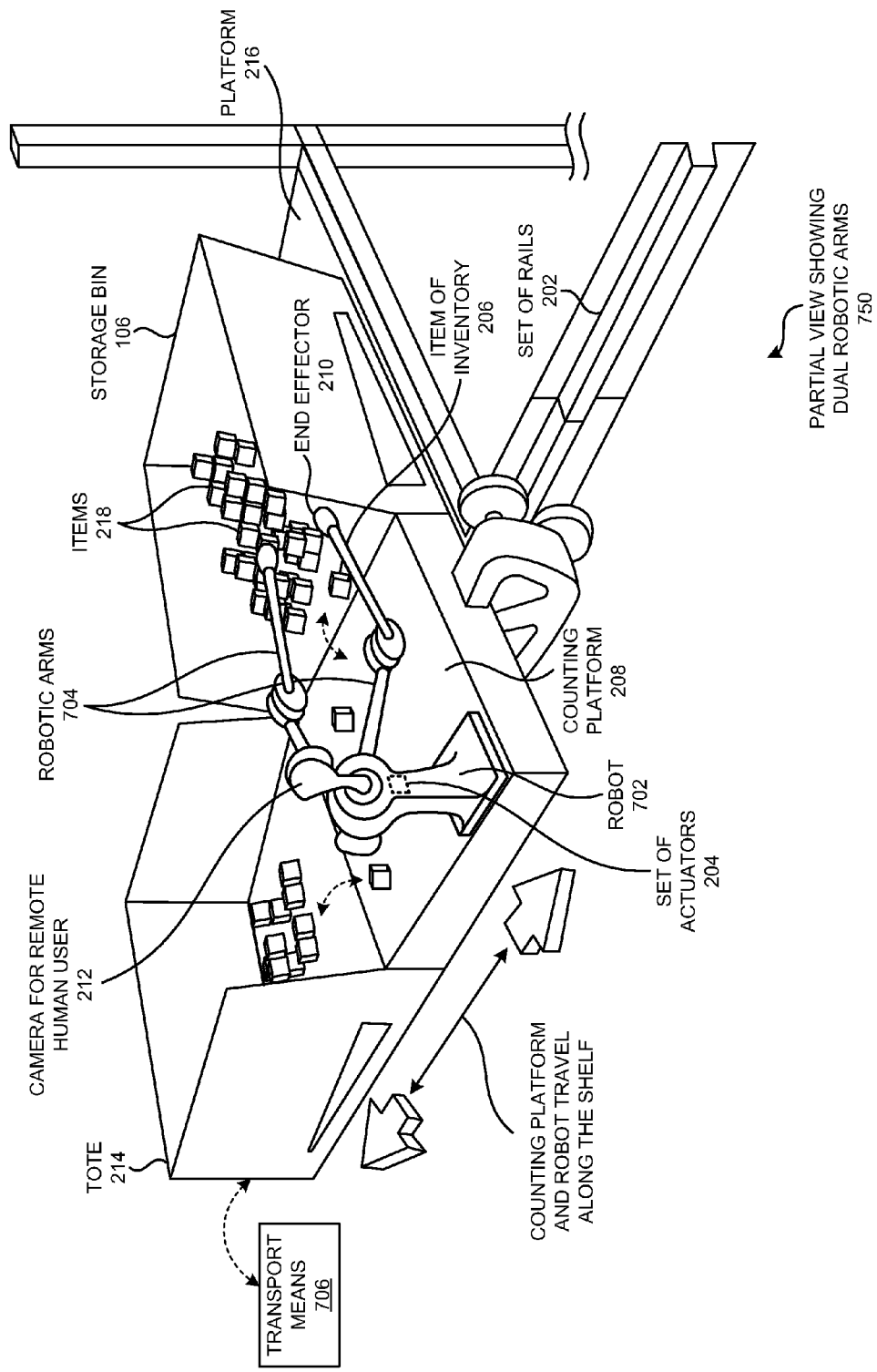
FIG. 7 is a partial view showing dual robotic arms performing the pick and place operation, according to one embodiment.

FIG. 7 is a partial view showing dual robotic arms 750 performing the pick and/or place operation, according to one embodiment. Particularly, partial view showing dual robotic arms 750 shows robot 702, robotic arms 704, and a transport means 706. A robot 702 may be an electro-mechanical machine with dual robotic arms 704 carrying out a complex series of operations (e.g., pick, place, push, and/or pull operations) controlled by the human user 304. The robotic arms 704 may be dual mechanical arms designed to execute pick, move, and/or place operations. The transport means 706 may be a carriable medium (e.g., a lift platform 120 and/or tube) adjacent to the one end of the shelf 104 to bring the item of inventory 206 up and/or down through the shelf 104, according to one embodiment.

Figure 8:
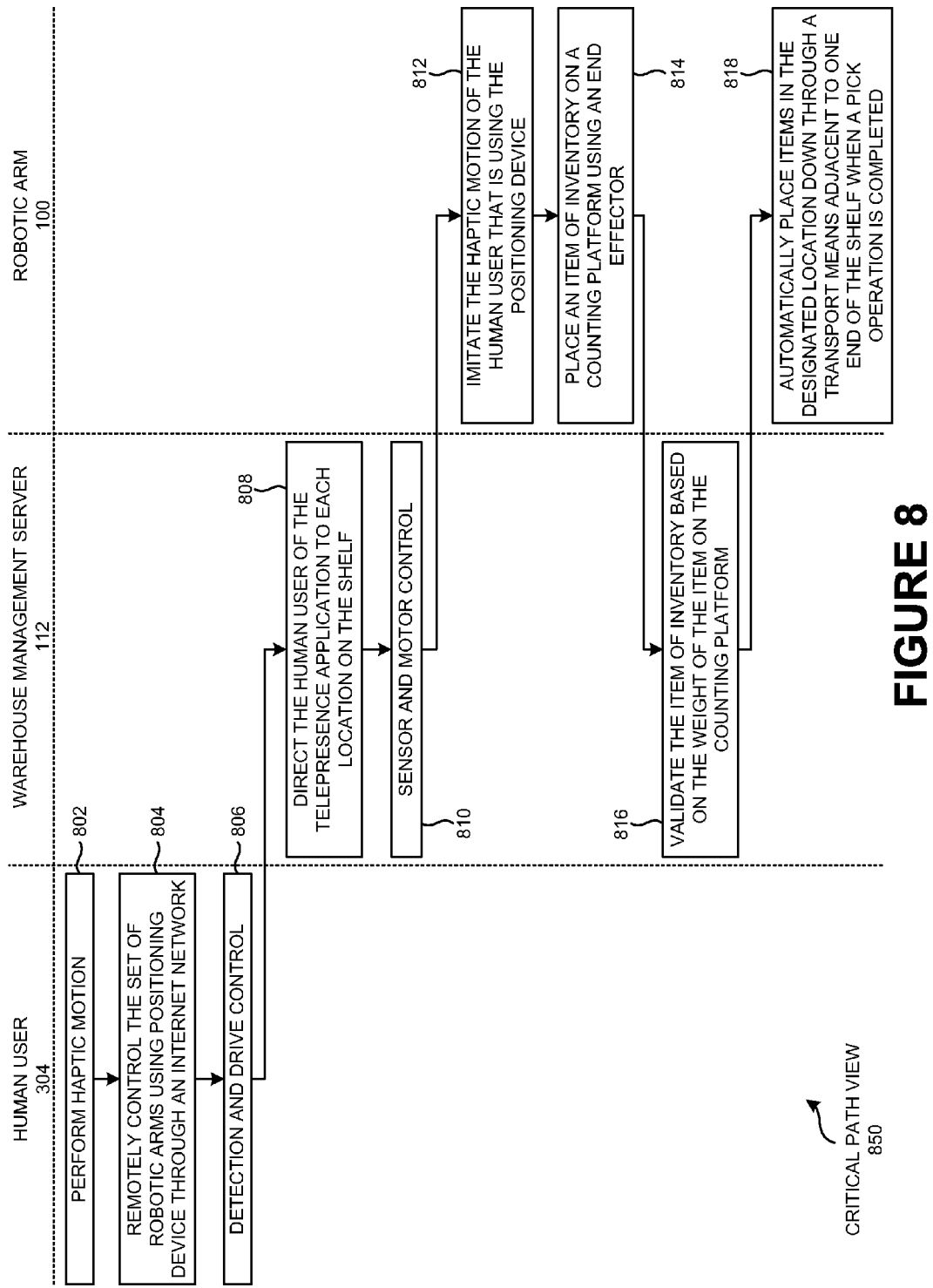
FIG. 8 is a critical path view illustrating a flow based on time where the pick and place operation is performed in the warehouse system of FIG. 1, according to one embodiment.

FIG. 8 is a critical path view 850 for automatically placing the items 218 in the designated location (e.g., tote 214, storage bin 106) up and/or down through a transport means 706 (e.g., a lift platform 120, tube) adjacent to one end of the shelf 104 when a pick operation 608 is completed, according to one embodiment. In operation 802, the human user 304 may perform the haptic motion 402. In operation 804, the human user 304 may remotely control the set of robotic arms (e.g., robotic arm 100) using the positioning device 314 through an Internet network 108. In operation 806, the human user 304 may detect and/or drive control the motion of the robotic arm 100, according to one embodiment. In operation 808, the warehouse management server 112 may direct the human user 304 of the telepresence application 312 to each location on the shelf 104, according to one embodiment. In operation 810, sensor and motor control signals may be sent to the warehouse management server 112 to activate and/or coordinate the desired movement and/or action of the robotic arm 100.

In operation 812, the robotic arm 100 may imitate the haptic motion 402 of the human user 304 that is using the positioning device 314. In operation 814, the robotic arm 100 may place an item of inventory 206 on a counting platform 208 using an end effector 210, according to one embodiment. In operation 816, the warehouse management server 112 may validate the item of inventory 206 based on the weight of the item (e.g., item of inventory 206) on the counting platform 208. In operation 818, the robotic arm 100 may automatically place the items 218 (e.g., item of inventory 206) in the designated location (e.g., tote 214, storage bin 106) down through a transport means 706 (e.g., lift platform 120, tube) adjacent to one end of the shelf 104 when a pick operation is completed, according to one embodiment.

Figure 9:
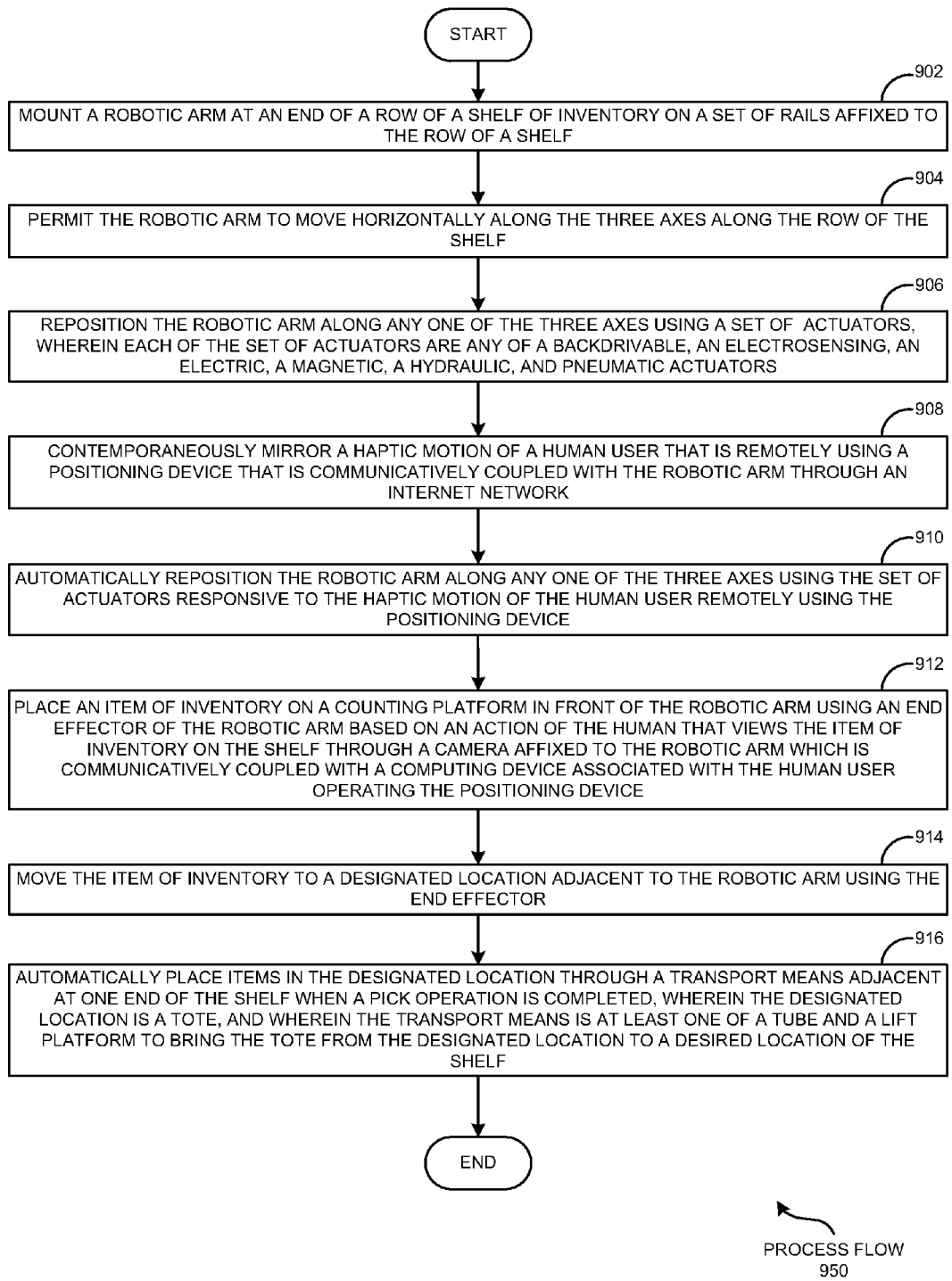
FIG. 9 is a process flow diagram illustrating automatic placement of items in a designated location when the pick operation is completed, according to one embodiment.

FIG. 9 is a process flow 950 illustrating automatic placement of items 218 in a desired location (e.g., conveyor belt 110) when the pick operation 608 is completed, according to one embodiment. In operation 902, a robotic arm 100 may be mounted at an end of a row 102 of a shelf of inventory (e.g., shelf 104) on a set of rails 202 affixed to the row 102 of a shelf 104. In operation 904, the robotic arm 100 may be permitted to move horizontally along the three axes along the row 102 of the shelf 104. In operation 906, the robotic arm 100 may be repositioned along the three axes using a set of actuators 204 (e.g., backdrivable, an electrosensing, an electric, a magnetic, a hydraulic, and/or pneumatic actuators).

In operation 908, a haptic motion 402 of a human user 304 may be mirrored contemporaneously that is remotely using a positioning device 314 (e.g. positioning arm, data gloves) that is communicatively coupled with the robotic arm 100 through an Internet network 108. In operation 910, the robotic arm 100 may be automatically repositioned along the three axes using the set of actuators 204 responsive to the haptic motion 402 of the human user 304 remotely using the positioning device 314. In operation 912, an item of inventory 206 may be placed on a counting platform 208 in front of the robotic arm 100 using an end effector 210 of the robotic arm 100 based on an action of a human (e.g., haptic motion 402 of the human user 304) that views the item of inventory 206 on the shelf 104 through a camera (e.g., camera for remote human user 212).

The camera (e.g., camera for remote human user 212) may be affixed to the robotic arm 100 which is communicatively coupled with a computing device 302 associated with the human user 304 operating the positioning device 314 (e.g. positioning arm, data gloves). In operation 914, the item of inventory 206 may be moved to a designated location (e.g., tote 214, storage bin 106) adjacent to the robotic arm 100 using the end effector 210. In operation 916, the items 218 (e.g., item of inventory 206) may be automatically placed in the designated location (e.g., tote 214, storage bin 106) up and/or down through a transport means 706 (e.g., lift platform 120, tube) adjacent to one end of the shelf 104 when a pick operation 608 is completed, according to one embodiment.

Figure 10:
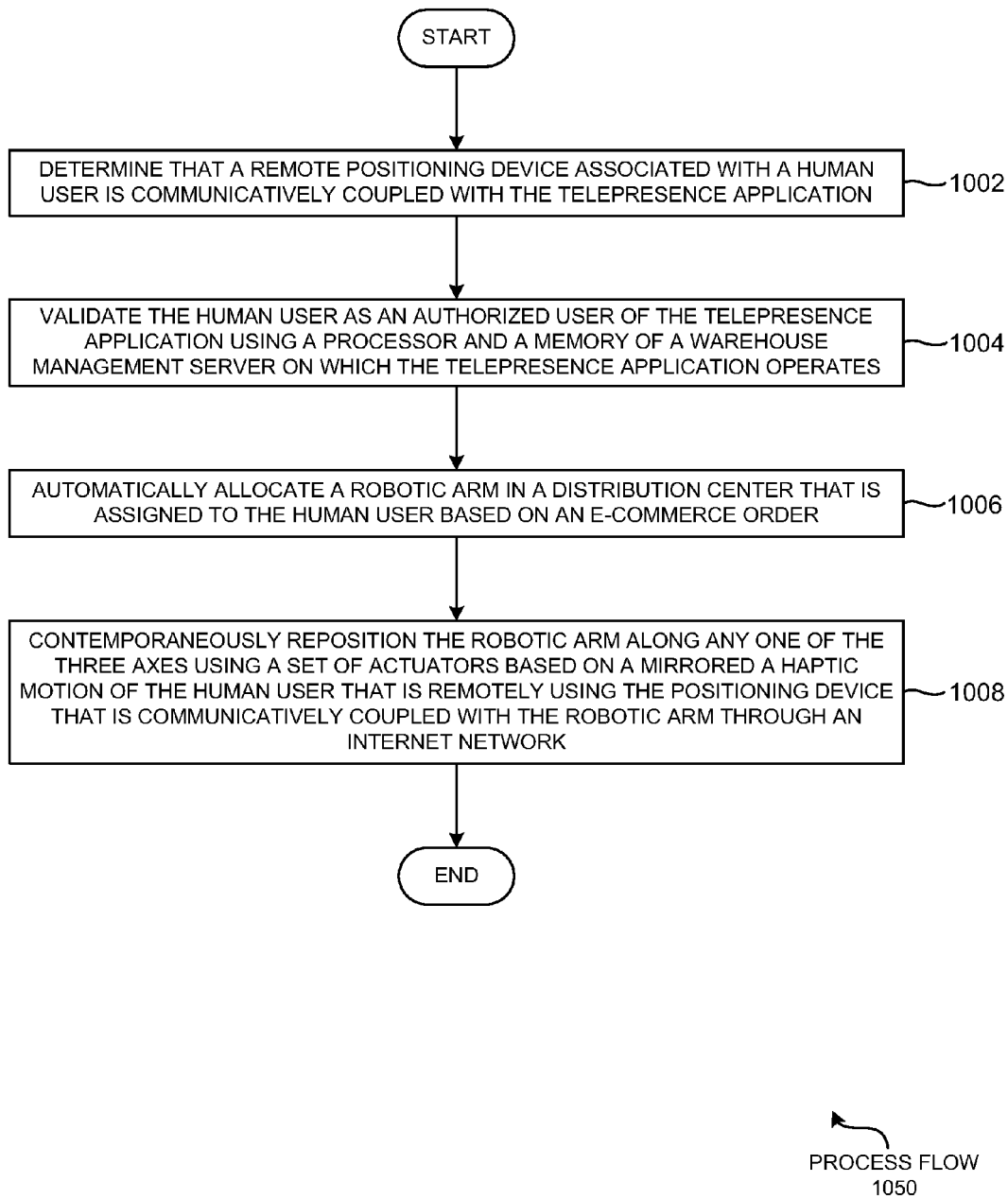
FIG. 10 is a process flow diagram illustrating repositioning of the robotic arm using a set of actuators based on a mirrored haptic motion of the human user, according to one embodiment.

FIG. 10 is a process flow 1050 illustrating repositioning of the robotic arm 100 using a set of actuators 204 based on mirrored haptic motion 402 of the human user 304, according to one embodiment. In operation 1002, telepresence application 312 may determine that a remote positioning device 314 (e.g., positioning arm, data gloves) associated with a human user 304 is communicatively coupled with the telepresence application 312. In operation 1004, telepresence application 312 may determine the human user 304 as an authorized user of the telepresence application 312 using a processor 114 and a memory 116 of a warehouse management server 112 on which the telepresence application 312 operates, according to one embodiment.

In operation 1006, a robotic arm 100 may be automatically allocated in a distribution center that is assigned to the human user 304 based on an e-commerce order. In operation 1008, the robotic arm 100 may be contemporaneously repositioned along the three axes using a set of actuators 204 based on a mirrored haptic motion 402 of the human user 304 that is remotely using a positioning device 314 (e.g., positioning arm, data gloves) that is communicatively coupled with the robotic arm 100 through an Internet network 108, according to one embodiment.

Figure 11:
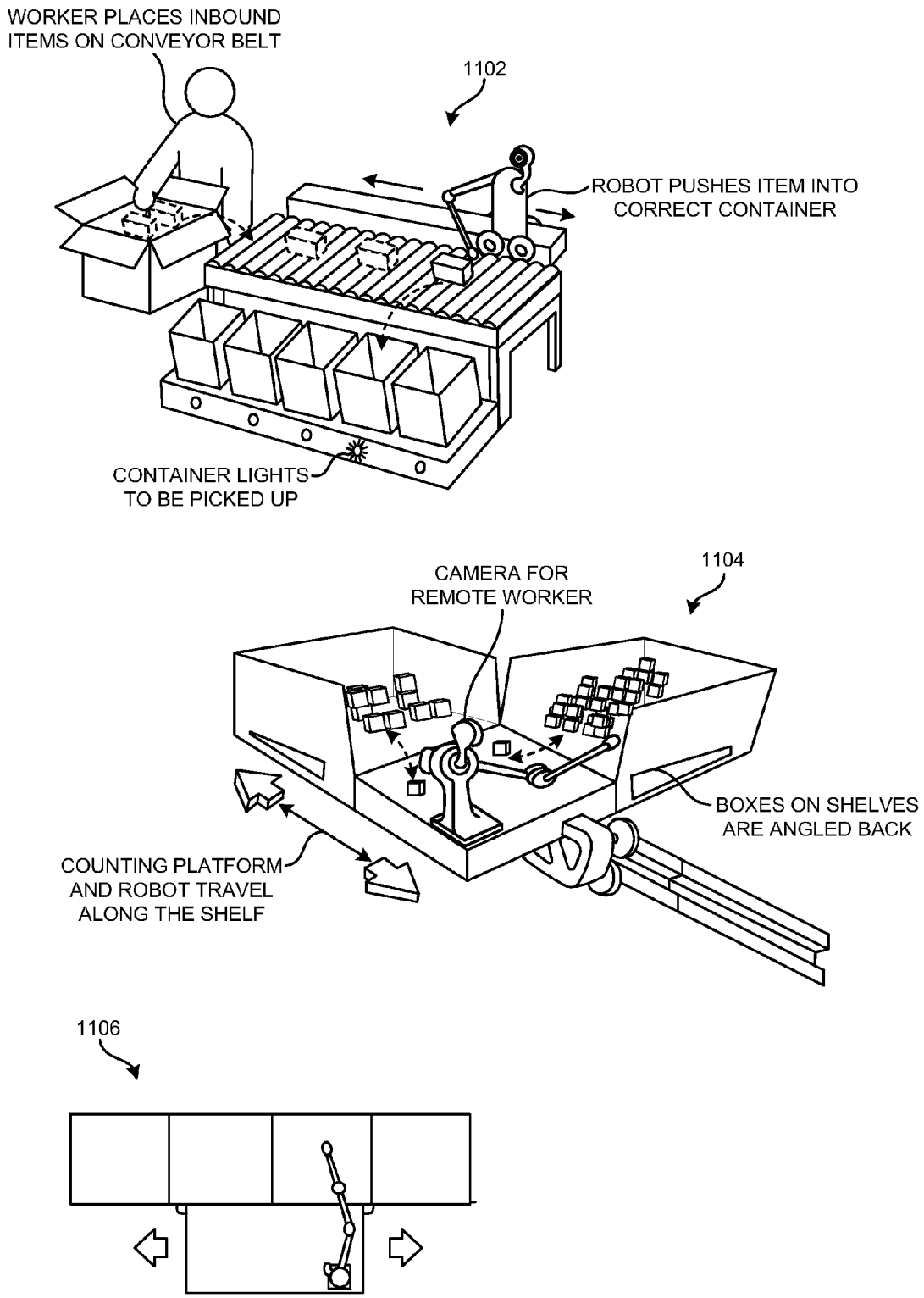
FIG. 11 illustrates various embodiments of the robotic arm of FIG. 1, according to one embodiment.

FIG. 11 illustrates the various embodiments of the robotic arm 100, according to one embodiment. In '1102', the worker may place the inbound items 218 on the conveyor belt 110. The robot may be mounted on the set of rails attached across the conveyor belt 110. The robot may push the item of inventory 206 into the designated container. The container may light to be picked up. The view '1104' shows various features of the robotic arm 100, the box (e.g., storage bin 106) may be angled back on the shelf 104 to hold the items 218 and/or prevent the items 218 from falling off the shelf 104. The counting platform 208 and robot 702 may travel along the shelf 104. The camera for remote worker (e.g., camera for remote human user 212) may provide a close-up view of the items 218 inside the storage bin 106 to the human user 304 that is operating the telepresence application 312. View '1106' shows the top view of the operation of the robotic arm 100 along the row 102 of the shelf 104.

Figure 12:
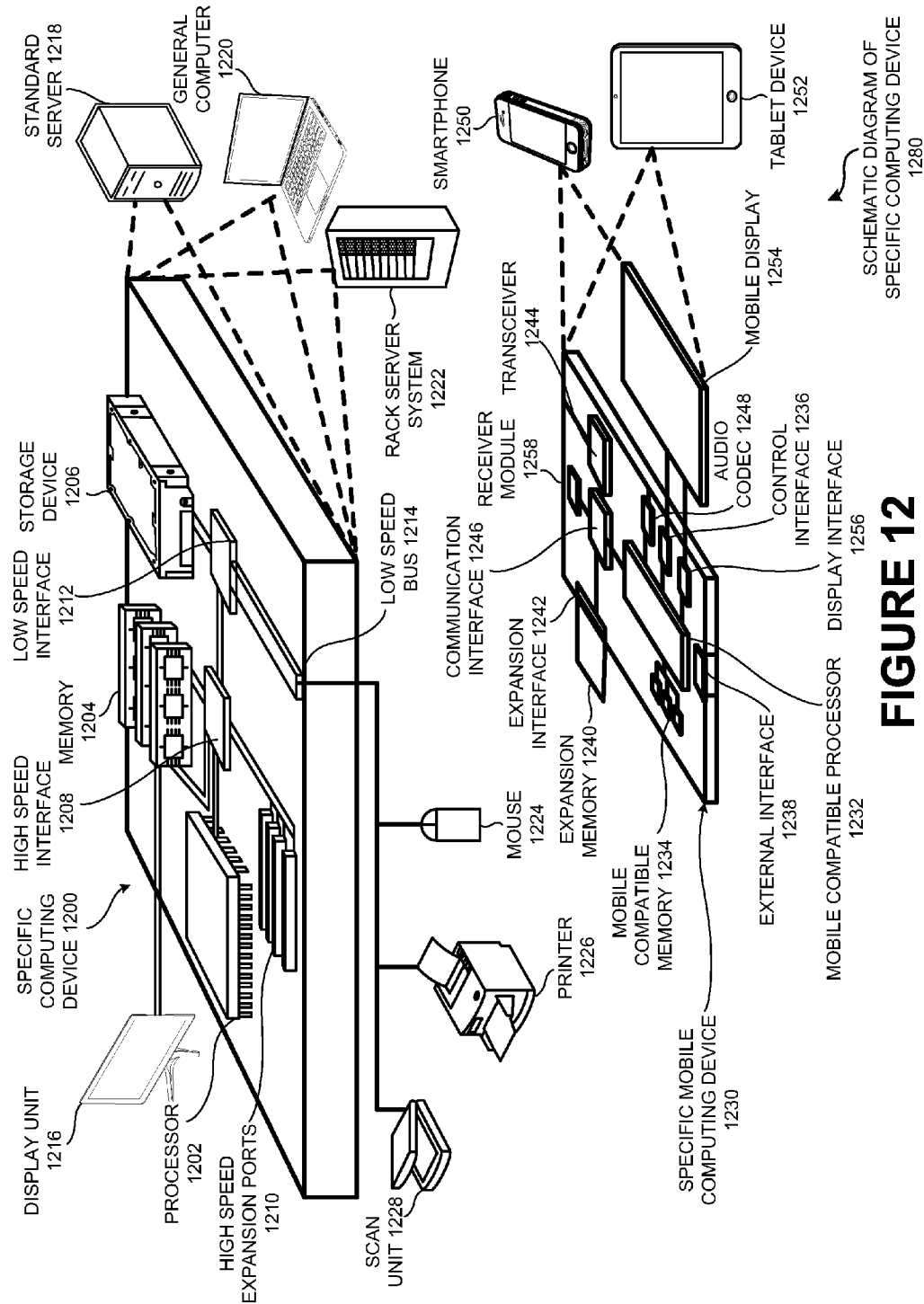
FIG. 12 is a schematic diagram of exemplary data processing devices that can be used to implement the methods and systems disclosed in FIG. 1, according to one or more embodiments.

FIG. 12 is a schematic diagram of specific computing device 1280 of specific computing device 1200 that can be used to implement the methods and systems disclosed herein, according to one embodiment. FIG. 12 is a schematic diagram of specific computing device 1280 of the specific computing device 1200 (e.g., computing device 302 of FIG. 3-4) and a specific mobile computing device 1230 that can be used to perform and/or implement any of the embodiments disclosed herein.

The specific computing device 1200 may represent various forms of digital computers, such as laptops, desktops, workstations, personal digital assistants, servers, blade servers, mainframes, and/or other appropriate computers. The specific mobile computing device 1230 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

The specific computing device 1200 may include a processor 1202 (e.g., processor 114 of FIGS. 1 and 3), a memory 1204 (e.g., memory 116 of FIGS. 1 and 3), a storage device 1206, a high speed interface 1208 coupled to the memory 1204 (e.g., memory 116 of FIGS. 1 and 3) and a plurality of high speed expansion ports 1210, and a low speed interface 1212 coupled to a low speed bus 1214 and a storage device 1206. In one embodiment, each of the components heretofore may be inter-coupled using various buses, and may be mounted on a common motherboard and/or in other manners as appropriate.

The processor 1202 (e.g., processor 114 of FIGS. 1 and 3) may process instructions for execution in the specific computing device 1200 (e.g., computing device 302 of FIG. 3-4), including instructions stored in the memory 1204 (e.g., memory 116 of FIGS. 1 and 3) and/or on the storage device 1206 to display a graphical information for a GUI on an external input/output device, such as a display unit 1216 coupled to the high speed interface 1208. In other embodiments, multiple processor(s) 1202 (e.g., processor 114 of FIGS. 1 and 3) and/or multiple buses may be used, as appropriate, along with multiple memories and/or types of memory 1204 (e.g., memory 116 of FIGS. 1 and 3). Also, a plurality of specific computing device 1200 may be coupled with each device providing portions of the necessary operations (e.g., as a server bank, a group of blade servers, and/or a multi-processor system).

The memory 1204 (e.g., memory 116 of FIGS. 1 and 3) may be coupled to the specific computing device 1200 (e.g., computing device 302 of FIG. 3-4). In one embodiment, the memory 1204 (e.g., memory 116 of FIGS. 1 and 3) may be a volatile memory. In another embodiment, the memory 1204 (e.g., memory 116 of FIGS. 1 and 3) may be a non-volatile memory. The memory 1204 (e.g., memory 116 of FIGS. 1 and 3) may also be another form of computer-readable medium, such as a magnetic and/or an optical disk. The storage device 1206 may be capable of providing mass storage for the specific computing device 1200 (e.g., computing device 302 of FIG. 3-4).

In one embodiment, the storage device 1206 may be included of a floppy disk device, a hard disk device, an optical disk device, a tape device, a flash memory and/or other similar solid state memory device. In another embodiment, the storage device 1206 may be an array of the devices in a computer-readable medium previously mentioned heretofore, computer-readable medium, such as, and/or an array of devices, including devices in a storage area network and/or other configurations.

A computer program may be included of instructions that, when executed, perform one or more methods, such as those described above. The instructions may be stored in the memory 1204 (e.g., memory 116 of FIGS. 1 and 3), the storage device 1206, a memory 1204 (e.g., memory 116 of FIGS. 1 and 3) coupled to the processor 1202 (e.g., processor 114 of FIGS. 1 and 3), and/or a propagated signal.

The high speed interface 1208 may manage bandwidth-intensive operations for the specific computing device 1200 (e.g., computing device 302 of FIG. 3-4), while the low speed interface 1212 may manage lower bandwidth-intensive operations. Such allocation of functions is exemplary only. In one embodiment, the high speed interface 1208 may be coupled to the memory 1204 (e.g., memory 116 of FIGS. 1 and 3), the display unit 1216 (e.g., through a graphics processor and/or an accelerator), and to the plurality of high speed expansion ports 1210, which may accept various expansion cards.

In the embodiment, the low speed interface 1212 may be coupled to the storage device 1206 and the low speed bus 1214. The low speed bus 1214 may be included of a wired and/or wireless communication port (e.g., a Universal Serial Bus ("USB"), a Bluetooth® port, an Ethernet port, and/or a wireless Ethernet port). The low speed bus 1214 may also be coupled to scan unit 1228, a printer 1226, a keyboard, a mouse 1224, and a networking device (e.g., a switch and/or a router) through a network adapter.

The specific computing device 1200 (e.g., computing device 302 of FIG. 3-4) may be implemented in a number of different forms, as shown in the FIG. 1280. In one embodiment, the specific computing device 1200 may be implemented as a standard server 1218 (e.g., warehouse management server 112) and/or a group of such servers. In another embodiment, the specific computing device 1200 (e.g., computing device 302 of FIG. 3-4) may be implemented as part of a rack server system 1222. In yet another embodiment, the specific computing device 1200 (e.g., computing device 302 of FIG. 3-4) may be implemented as a general computer 1220 such as a laptop and/or desktop computer. Alternatively, a component from the specific computing device 1200 may be combined with another component in a specific mobile computing device 1230.

In one or more embodiments, an entire system may be made up of a plurality of specific computing device 1200 and/or a plurality of specific computing device 1200 coupled to a plurality of specific mobile computing device 1230.

In one embodiment, the specific mobile computing device 1230 may include a mobile compatible processor 1232, a mobile compatible memory 1234, and an input/output device such as a mobile display 1254, a communication interface 1246, and a transceiver 1244, among other components. The specific mobile computing device 1230 may also be provided with a storage device, such as a Microdrive and/or other device, to provide additional storage. In one embodiment, the components indicated heretofore are inter-coupled using various buses, and several of the components may be mounted on a common motherboard.

The mobile compatible processor 1232 may execute instructions in the specific mobile computing device 1230, including instructions stored in the mobile compatible memory 1234. The mobile compatible processor 1232 may be implemented as a chipset of chips that include separate and multiple analog and digital processors. The mobile compatible processor 1232 may provide, for example, for coordination of the other components of the specific mobile computing device 1230, such as control of user (e.g., human user 304 of FIG. 3-4) interfaces, applications run by the specific mobile computing device 1230, and wireless communication by the specific mobile computing device 1230.

The mobile compatible processor 1232 may communicate with a user (e.g., human user 304 of FIG. 3-4) through the control interface 1236 and the display interface 1256 coupled to a mobile display 1254. In one embodiment, the mobile display 1254 may be a Thin-Film-Transistor Liquid Crystal Display ("TFT LCD"), an Organic Light Emitting Diode ("OLED") display, and another appropriate display technology. The display interface 1256 may include appropriate circuitry for driving the mobile display 1254 to present graphical and other information to a user (e.g., human user 304 of FIG. 3-4).

The control interface 1236 may receive commands from a user (e.g., human user 304 of FIG. 3-4) and convert them for submission to the mobile compatible processor 1232. In addition, an external interface 1238 may be provided in communication with the mobile compatible processor 1232, so as to enable near area communication of the specific mobile computing device 1230 with other devices. External interface 1238 may provide, for example, for wired communication in some embodiments, and/or for wireless communication in other embodiments, and multiple interfaces may also be used.

The mobile compatible memory 1234 may be coupled to the specific mobile computing device 1230. The mobile compatible memory 1234 may be implemented as a volatile memory and a non-volatile memory. The expansion memory 1240 may also be coupled to the specific mobile computing device 1230 through the expansion interface 1242, which may include, for example, a Single In Line Memory Module ("SIMM") card interface. The expansion memory 1240 may provide extra storage space for the specific mobile computing device 1230, and/or may also store an application and/or other information for the specific mobile computing device 1230.

Specifically, the expansion memory 1240 may include instructions to carry out the processes described above. The expansion memory 1240 may also include secure information. For example, the expansion memory 1240 may be provided as a security module for the specific mobile computing device 1230, and may be programmed with instructions that permit secure use of the specific mobile computing device 1230. In addition, a secure application may be provided on the SIMM card, along with additional information, such as placing identifying information on the SIMM card in a non-hackable manner.

The mobile compatible memory 1234 may include a volatile memory (e.g., a flash memory) and a non-volatile memory (e.g., a non-volatile random-access memory ("NVRAM")). In one embodiment, a computer program includes a set of instructions that, when executed, perform one or more methods. The set of instructions may be stored on the mobile compatible memory 1234, the expansion memory 1240, a memory coupled to the mobile compatible processor 1232, and a propagated signal that may be received, for example, over the transceiver 1244 and/or the external interface 1238.

The specific mobile computing device 1230 may communicate wirelessly through the communication interface 1246, which may be included of a digital signal processing circuitry. The communication interface 1246 may provide for communications using various modes and/or protocols, such as: a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 1244 (e.g., radio-frequency transceiver). In addition, short-range communication may occur, such as using a Bluetooth®, Wi-Fi, and/or other such transceiver. In addition, a GPS ("Global Positioning System") receiver module 1258 may provide additional navigation-related and location-related wireless data to the specific mobile computing device 1230, which may be used as appropriate by a software application running on the specific mobile computing device 1230.

The specific mobile computing device 1230 may also communicate audibly using an audio codec 1248, which may receive spoken information from a user (e.g., human user 304 of FIG. 3-4) and convert it to usable digital information. The audio codec 1248 may likewise generate audible sound for a user (e.g., human user 304 of FIG. 3-4), such as through a speaker (e.g., in a handset of the specific mobile computing device 1230). Such a sound may include a sound from a voice telephone call, a recorded sound (e.g., a voice message, a music files, etc.) and may also include a sound generated by an application operating on the specific mobile computing device 1230.

The specific mobile computing device 1230 may be implemented in a number of different forms, as shown in the FIG. 1280. In one embodiment, the specific mobile computing device 1230 may be implemented as a smartphone 1250. In another embodiment, the specific mobile computing device 1230 may be implemented as a personal digital assistant ("PDA"). In yet another embodiment, the specific mobile computing device 1230 may be implemented as a tablet device 1252.

It will be appreciated that the various embodiments described herein may operate in additional embodiments. For example, the robotic arm 100 on the shelf 104 may operate in context of a vending machine rather than in a warehouse system 150 (e.g., a giant urban vending machine to dispense a wide array of goods and services directly to customers placing orders through the Internet using a mobile device or phone). The vending machine in this alternate embodiment may operate through the Internet to automatically pick and/or place items inside of a dispenser of products for sale directly to consumers. Any of the various embodiments described in FIGS. 1-12 may operate in this vending machine context (e.g., the vending machine may be connected to a telepresence application through an Internet network).

Further, the various embodiments of FIGS. 1-12 may also operate with a gravity fed tote chute system (e.g., bound totes may be dropped into the top of the chute and picked totes drop out the bottom) rather than a tube as described in the various embodiments. At the robotic arm level the chute may have a gap where users can place a picked tote (to fall through to the bottom) and/or an actuator that stacks, top-loaded to put away totes. The actuator may stop the stack from entering the slot until the robotic arm is ready to grab that tote for put away (e.g., similarly to a Pez Dispenser® that goes in both directions with the opening in the middle). Further, to improve efficiency, items may need to be put into totes before they are loaded into the internet vending machine. In one alternate embodiment, the vending machine described herein that may operate with any of the various embodiments of FIGS. 1-12 may interoperate with standard inbound distribution center logistics for a system to function.

A "totifying" system may be utilized independently or in conjunction with the various embodiments described herein to deploy the toting system. For example, a conveyor with individual controllable rollers (e.g., having a precision dc motor) may be utilized. This conveyor may roll in front of 50 tote positions along one side of the conveyor. On the other side may be 5-10 robotic arms that gantry side-to-side just like they do on the shelves. At the end of the conveyor, there may be 1-2 people pulling random objects out of inbound shipping cartons. Every time a worker throws an item onto the conveyor, it may roll away to a "scan zone" where it's identified. Every identified item type may have a preassigned bin along the conveyor. These may be scheduled based on what we expect in both the inbound carton and/or total inbound shipment. The conveyor may roll that item to a spot in front of the item's assigned tote. A robotic arm may roll up to that position. A human may be attached to the robotic arm's telepresence and may validate the item and may then push the item into the tote. When a tote is completed (per the expected shipment), it may light up. A human may put it on a conveyor that may take it to the loading station at the top of the vending machine. This "totifying system" may be perfect for any sort/inspect/select conveyor system such as those found in agriculture, confectionery operations, etc.

In other alternate embodiments, additional concepts are contemplated including *A system of cubbies of various sizes that may be available to approved tenants to store items for shipment. *A tenant API that may allow vendors to reserve cubbies of a certain size starting on a certain date. *A "public" vendor API that may enable: (1) An API key management system to optionally permit tenants to restrict API use per item to a specified set of users. (e.g., approved web retailers). (2) Permit anyone (or authorized users) with an appropriately validated API key to query item availability. (3) Permit anyone (or authorized users) with an appropriately validated API key to query item cost. (4) Permit anyone (or authorized users) with an appropriately validated API key to select delivery method and cost. (5) Permit anyone (or authorized users) with an appropriately validated API key to order items out of the machine after settlement. (6) Track location of shipped items. (7) A "private" vendor API may: allow the tenant (only) to track and ship items from a cubby. (8) An economic equilibrium formula may be used in conjunction with any of the embodiment disclosed herein including (9) The "holding cost" of an item that may not move/sell quickly may go from 0→N $/day. (This starts from the cubby reserve date.) (10) The ability to (optionally) accept bid prices for items in the machine. (11) The ability to optionally present liquidation/clearance via the public API. (12) The ability to optionally transfer "ownership" of a cubby (with its items) to a different tenant. (13) A wholesale liquidation option may also be provided. (14) The ability to store the same item in multiple cubbies is also contemplated in one embodiment. (15) The ability to consolidate the same item from multiple cubbies down to one cubby, is yet another contemplated embodiment consistently with any of the embodiments described herein. In one alternate embodiment, "specialty storefronts" may be created near the vending machine that allow local vendors to store and retrieve items from the vending machine, so that items can be accessed by the public directly.

In another alternate embodiment, since the various embodiments described in FIGS. 1-12 may have captured video of every pick, this video and/or audio information may be relayed to several downstream and/or historical processes such as a QA pick validation team. For example, through this methodology: *every pick may be reviewable by a statistical QA process via telepresence, according to one embodiment. *every pick may have a vendor review record for customer issue validation, according to one embodiment. *every pick may have the chance to show the customer their item getting picked for their own personal review, according to one embodiment. *every pick may allow supervisors to grade trainees, according to one embodiment. *every pick may allow supervisors to train new employees, according to one embodiment. *every pick may allow quality assurance, managers, independent auditors, and/or independent contractors to review packaging and process on behalf of the customer, according to one embodiment. *loss prevention review may be possible, according to one embodiment. *schedule 1 and 2 pharmaceutical control function may be possible, according to one embodiment. In other words, the video record may have significant downstream, review and audit value when utilized in conjunction with the various embodiments of FIGS. 1-12.

An example embodiment will now be described. A Delta Distribution Center, Inc. based in North America may be a manufacturer and distributor of specialty fans for the high-end consumer market. A Delta Distribution Center, Inc. may sell its goods directly to the customers who have ordered products through catalogues or online stores. The Delta Distribution Center, Inc. may have a warehouse in Tampa Fla. to serve as a single location to stock and fulfill a vast number of products. By deploying the various embodiments described in FIGS. 1-12, Delta Distribution Center, Inc. may have now have sufficient space to store stock in many different packaging styles and/or quantities. Further, the management team of Delta Distribution Center, Inc. may not need to hire additional warehouse operators to pick and/or place items when sales increase in the holiday season by deploying the various embodiments of FIGS. 1-12.

In addition, material handling may no longer be a primary source of hazard in the Delta Distribution warehouse in Tampa Fla. For example, a warehouse operator John Smith may no longer need to enter the lift basket and manually perform hazardous tasks such as picking and collecting items from higher shelves, thanks to the various embodiments described in FIGS. 1-12. This may reduce labor expenses in training and skilled labor, making Delta Distribution a more profitable business. Also, the warehouse operator of the Delta Distribution warehouse in Tampa may no longer need to climb ladders to get to top shelves or racks to access needed inventory, thanks to the various embodiments described in FIGS. 1-12. Therefore, Delta Distribution may save money by reducing costs for professional hazard insurances for workplace injury and/or occupational risks, thanks to the various embodiments described in FIGS. 1-12.

In the competitive high-end fan industry, the speed of fulfilling orders from the time an order is placed online to when it is shipped and sent to a customer may be important. For this reason, the management of Delta Distribution Center, Inc. may have adopted a warehouse system (as described in the various embodiments of FIGS. 1-12) that enables them to automate processes and/or improve operations to save time and/or money.

For example, thanks to the various embodiments of the FIGS. 1-12, the Delta Distribution Center, Inc. may implement the methods and/or system described herein to perform pick and/or place operations through robotic arms based on a telepresence application. Instead of having warehouse operators manually study paper maps and then go to the shelf and pick intended items of inventory from rows of a shelf, the various embodiments described herein may facilitate hands-free order picking and eliminate extra labor.

The management of Delta Distribution Center, Inc. may now integrate new techniques such as mobile robotics and telepresence technology into material handling to ensure quality and/or accuracy using the embodiments of FIGS. 1-12. A robust warehouse management system (as described in the various Figures from FIGS. 1-12) may be employed in the Delta Distribution Center, Inc. for its efficient working. The warehouse operator (e.g., human user 304) of the Delta Distribution Center, Inc. may handle the task of picking and/or placing the item of inventory just by sitting at one place in the control room of the distribution center.

For example, the warehouse operator (e.g., human user 304) may wear positioning arm (e.g., positioning device 314) to perform the motion (e.g., haptic motion 402) that may be mimicked by the robotic arm (e.g., robotic arm 100) as mounted on the rails (e.g., set of rails 202) across each row of the shelf (e.g., row 102 of the shelf 104) through telepresence technology (e.g., telepresence application 312). The warehouse operator (e.g., human user 304) may have a sense of being on location (e.g., near to the shelf 104) by employing the telepresence technology in the control room of the Delta Distribution Center, Inc. (and/or at an offsite location). The warehouse operator (e.g., human user 304) may accurately recognize the position and/or orientation of an item (e.g., item of inventory 206) through the camera (e.g., camera 220) mounted on the top of the row (e.g., row 102) just above the storage bin 106.

By employing the methods and/or systems described in the FIGS. 1-12, the Delta Distribution Center, Inc. may reduce processing time, enhance productivity, reduce labor and operational costs making the affordability enticing, minimize travel time, increase order accuracy and/or number of orders that can be picked each day, have fewer safety incidents, and/or improve cycle times. As a result, the pick and/or place operations in the Delta Distribution Center, Inc. may now be accelerated, making the company thrive in an otherwise competitive market.

It should be noted that a variation of the various embodiments described herein could include mounting the robotic arm onto a bar or beam above an item of inventory—this variation could apply to situations where the item of inventory is on the floor of the facility such as boxes or cases stored on pallets, or the item of inventory is hanging on a rod such as garments on hangers.

Various embodiments of the systems and techniques described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a human user, the systems and techniques described here may be implemented on a computing device having a display device (e.g., a cathode ray tube ("CRT") and/or liquid crystal display ("LCD") monitor) for displaying information to the human user, keyboard and a mouse by which the human user can provide input to the computer (e.g., computing device). Other kinds of devices can be used to provide for interaction with a human user as well; for example, feedback provided to the human user can be any form of sensory feedback (e.g., visual feedback, auditory feedback, and/or tactile feedback) and input from the human user can be received in any form, including acoustic, speech, and/or tactile input.

The systems and techniques described here may be implemented in a computing device that comprises at least one of a back end component (e.g., as a data server), a middleware component (e.g., an application server), a front end component (e.g., a client computer having a graphical user interface, and/or a Web browser through which a human user can interact with an embodiment of the systems and techniques described here), and a combination thereof. The components of the system may also be coupled through a communication network.

The communication network may comprise at least one of a local area network ("LAN") and a wide area network ("WAN") (e.g., the Internet). The warehouse system 150 can comprise at least one of a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method comprising:
   mounting a robotic arm at an end of a row of a shelf of inventory on a set of rails affixed to the row of a shelf;
   permitting the robotic arm to move horizontally along the three axes along the row of the shelf;
   repositioning the robotic arm along any one of the three axes using a set of actuators, wherein each of the set of actuators are any of a backdrivable, an electrosensing, an electric, a magnetic, a hydraulic, and pneumatic actuators;
   contemporaneously mirroring a haptic motion of a human user that is remotely using a positioning device that is communicatively coupled with the robotic arm through an Internet network;
   automatic repositioning of the robotic arm along any one of the three axes using the set of actuators responsive to the haptic motion of the human user remotely using the positioning device;
   placing an item of inventory on a counting platform in front of the robotic arm using an end effector of the robotic arm based on an action of a human that views the item of inventory on the shelf through a camera affixed to the robotic arm which is communicatively coupled with a computing device associated with the human user operating the positioning device;
   moving the item of inventory to a designated location adjacent to the robotic arm using the end effector; and
   automatically placing the items in the designated location down through a transport means adjacent to one end of the shelf when a pick operation is completed,
      wherein the designated location is at least one of a tote and a storage bin, and
      wherein the transport means is at least one of a tube and a lift platform to bring the tote from the designated location to a desired location of the shelf.

2. The method of claim 1,
   wherein the item of inventory is placed on a platform having an angled surface such that the storage bin in which the item of inventory is placed is angled upward and does not fall off the shelf when placed on the counting platform, and
   wherein the item of inventory is validated based on a weight of an item on the counting platform.

3. The method of claim 1,
   wherein a telepresence application is used to provide the positioning device control over the robotic arm remotely through the Internet network.

4. The method of claim 3,
   wherein the shelf includes a plurality of rows of the shelf and a plurality of robotic arms, wherein each of the rows of the shelf includes one or more robotic arms that horizontally traverses a particular row in which it is affixed.

5. The method of claim 4,
   wherein each of the robotic arms coordinates with a warehouse management server to automatically direct the human user of the telepresence application to each location on the shelf associated with the items needed to be fulfilled in an e-commerce order.

6. The method of claim 4,
   wherein each item of an e-commerce order is automatically deposited through respective ones of the plurality of robotic arms into a packing box on a conveyer belt of a distribution center when the items are deposited down through the tube adjacent to the one end of the shelf.

7. The method of claim 6,
   wherein the telepresence application detects that the human has completed a movement of the items onto the counting platform and directs the human user to a next one of a plurality of the robotic arms positioned in front of the storage bin where a selection is needed.

8. The method of claim 7,
   wherein a neural network automatically monitors a behavior of the human user and continuously learns how to improve the pick and place of a particular type of item from the shelf such that, over time, a control program learns how to control the robotic arm to automatically select the items onto the counting platform without a human intervention or a human haptic control.

9. The method of claim 1,
wherein the end effector of the robotic arm is at least one of a supple rubber end point, a gripping arm, a sticky polymer end, an impactive end effector, an ingressive end effector, an astrictive end effector, and a contigutive end effector.

10. The method of claim 1,
wherein a robot has two robotic arms with actuator control to permit the human user to grab and lift the items.

11. The method of claim 1,
wherein the robotic arm can safely operate around the human operators in a distribution center by slowly coming to a stop and not having to stop abruptly when an adjacent object is detected which is likely to obstruct a motion of the robotic arm through compliance to prevent users and operators being injured.

12. A method of a telepresence application comprising:
determining that a remote positioning device associated with a human user is communicatively coupled with the telepresence application;
validating the human user as an authorized user of the telepresence application using a processor and a memory of a warehouse management server on which the telepresence application operates;
automatically allocating a robotic arm in a distribution center that is assigned to the human user based on an e-commerce order;
contemporaneously repositioning the robotic arm along any one of the three axes using a set of actuators based on a mirrored haptic motion of the human user that is remotely using a positioning device that is communicatively coupled with the robotic arm through an Internet network.

13. The method of the telepresence application of claim 12 further comprising:
providing a view of an item of inventory directly in front of the robotic arm to the human user who is remotely controlling the robotic arm through the positioning device,
wherein the robotic arm to place the item of inventory on a counting platform in front of the robotic arm using an end effector of the robotic arm based on an action of a human that views the item of inventory on a shelf through a camera affixed to the robotic arm which is communicatively coupled with a computing device associated with the human user operating the positioning device based on a place command from the telepresence application;
wherein the robotic arm to validate the item of inventory based on a weight of the item on the counting platform based on a validate command from the telepresence application;
wherein the robotic arm to move the item of inventory in a location adjacent to the robotic arm using the end effector based on a move command from the telepresence application; and
moving the items at the location down through a tube adjacent to one end of the shelf when a pick operation is completed based on a complete command from the telepresence application.

14. The method of claim 12,
wherein an item of inventory is placed on a platform having an angled surface such that a storage bin in which the item of inventory is placed is angled upward and does not fall off a shelf when placed on a counting platform.

15. The method of claim 12,
wherein the telepresence application is used to provide the positioning device control over the robotic arm remotely through the Internet network.

16. The method of claim 14:
wherein the shelf includes a plurality of rows of the shelf and a plurality of robotic arms, wherein each of the rows of the shelf includes a different robotic arm, and
wherein each of the rows of the shelf includes one or more different robotic arms that horizontally traverses a particular row in which it is affixed.

17. The method of claim 15,
wherein each of the robotic arms to coordinate with the warehouse management server to automatically direct the human user of the telepresence application to each location on a shelf associated with the items needed to be fulfilled in the e-commerce order.

18. The method of claim 16,
wherein each item of the e-commerce order is automatically deposited through respective ones the plurality of robotic arms into a packing box on a conveyer belt of the distribution center when the items are deposited down through a tube adjacent to one end of the shelf.

19. The method of claim 17,
wherein the telepresence application detects that a human has completed a movement of the items onto a counting platform and directs the human user to a next one of a plurality of the robotic arms positioned in front of a storage bin where a selection is needed.

20. The method of claim 18,
wherein a neural network to automatically monitor a behavior of the human user and to continuously learn how to better pick and place a particular type of item from the shelf such that, over time, the robotic arm is able to automatically pick the item and place the item at a location without requiring mirroring of a haptic motion of the human user that is remotely using a positioning arm.

21. The method of claim 12:
wherein an end effector of the robotic arm is at least one of a supple rubber end point, a gripping arm, a sticky polymer end, an impactive end effector, an ingressive end effector, an astrictive end effector, and a contigutive end effector, and
wherein the robotic arm to safely operate around the human operators in the distribution center by slowly coming to a stop and not having to stop abruptly when an adjacent object is detected which is likely to obstruct a motion of the robotic arm.

22. A warehouse system, comprising:
a set of robotic arms that are each affixed to the individual rows of shelving in a distribution center to reposition horizontally along the individual rows of shelving along any one of the three axes using a set of actuators;
an Internet network;
a warehouse management server having a telepresence application coupled with the set of robotic arms through the Internet network to provide a human user remote control over each of a set of the robotic arms through the Internet network;
a positioning device coupled with each of the set of robotic arms and the warehouse management server having the telepresence application through the Internet network that is haptically controlled by a human user in a manner such that a haptic motion of the human user of the positioning device is imitated through a mirrored repositioning of the set of robotic arms.

23. The warehouse system of claim 22,
wherein an item of inventory is placed on a platform having an angled surface such that a storage bin in which the item of inventory is placed is angled upward and does not fall off a shelf when placed on a counting platform.

24. The warehouse system of claim 22,
wherein the telepresence application is used to provide the positioning device control over a robotic arm remotely through the Internet network.

25. The warehouse system of claim 24:
wherein a shelf includes a plurality of rows of the shelf and a plurality of robotic arms, wherein each of the rows of the shelf includes a different robotic arm, and
wherein each of the rows of the shelf includes one or more different robotic arm that horizontally traverses a particular row in which it is affixed.

26. The warehouse system of claim 25,
wherein each of the robotic arms to coordinate with the warehouse management server to automatically direct the human user of the telepresence application to each location on the shelf associated with the items needed to be fulfilled in an e-commerce order.

27. The warehouse system of claim 26,
wherein each item of the e-commerce order is automatically deposited through respective ones of the plurality of robotic arms into a packing box on a conveyer belt of the distribution center when the items are deposited down through a tube adjacent to one end of the shelf.

28. The warehouse system of claim 27,
wherein the telepresence application detects that a human has completed a movement of the items onto a counting platform and directs the human user to a next one of a plurality of the robotic arms positioned in front of a storage bin where a selection is needed.

29. The warehouse system of claim 28,
wherein a neural network to automatically monitor a behavior of the human user and to continuously learn how to better pick and place a particular type of item from the shelf such that, over time, the robotic arm is able to automatically pick the item and place the item at the location without requiring mirroring of the haptic motion of the human user that is remotely using a positioning arm.

30. The warehouse system of claim 22,
wherein an end effector of a robotic arm is at least one of a supple rubber end point, a gripping arm, a sticky polymer end, an impactive end effector, an ingressive end effector, an astrictive end effector, and a contigutive end effector, and
wherein the robotic arm to safely operate around the human operators in the distribution center by slowly coming to a stop and not having to stop abruptly when an adjacent object is detected which is likely to obstruct a motion of the robotic arm.

* * * * *